United States Patent [19]

Sprague et al.

[11] Patent Number: 5,247,575
[45] Date of Patent: Sep. 21, 1993

[54] INFORMATION DISTRIBUTION SYSTEM

[76] Inventors: Peter J. Sprague, 249 Undermountain Rd., Lenox, Mass. 02140; Thomas H. Lipscomb, 145 E. 74th St., New York, N.Y. 10021

[21] Appl. No.: 874,991

[22] Filed: Apr. 24, 1992

Related U.S. Application Data

[63] Continuation of Ser. No. 366,150, Jun. 14, 1989, abandoned, which is a continuation-in-part of Ser. No. 338,275, Apr. 14, 1989, abandoned, which is a continuation-in-part of Ser. No. 232,706, Aug. 16, 1988, abandoned.

[51] Int. Cl.[5] .................. H04K 1/02; H04B 17/00; H04N 7/00
[52] U.S. Cl. .......................... 380/9; 358/84; 358/86; 455/2
[58] Field of Search ............... 358/86, 84; 380/5, 10, 380/3, 9; 455/2

[56] References Cited

U.S. PATENT DOCUMENTS

| | | | |
|---|---|---|---|
| 4,361,851 | 11/1982 | Asip et al. | 358/86 |
| 4,467,424 | 8/1984 | Hedges et al. | 364/412 |
| 4,586,078 | 4/1986 | Citta et al. | 358/86 |
| 4,695,880 | 9/1987 | Johnson et al. | 358/86 |
| 4,780,757 | 10/1988 | Bryer | 358/86 |
| 4,789,863 | 12/1988 | Bush | 358/86 |

OTHER PUBLICATIONS

*IEEE Journal on Selected Areas in Communication*, "The Application of Digital Broadcast Communication to Large Scale Information Systems", David Gifford, John Lucassen, Stephen Berlin, May 1985, Journal vol. SAC-3, No. 3.

*Primary Examiner*—Stephen C. Buczinski

[57] ABSTRACT

An information distribution system provides information to a user, when the information corresponds to criteria individually selected by the user, and then charges the user only for the selected information thus provided. Encrypted information packages (IP's) are provided at the user site, via high and/or low density storage media and/or by broadcast transmission. The IP's selected by the user are decrypted and then printed or displayed for viewing by the user. The charges for the IP's thus displayed are accumulated within the user apparatus and periodically reported by telephone to the system's central accounting facility which issues encryption keys. The encryption keys, used to decrypt the IP's, are changed periodically. If the central accounting facility has not issued a new encryption key for a particular user station, the station is unable to retrieve information from the system when the key is changed.

10 Claims, 12 Drawing Sheets

BROADCAST DATA RECEPTION UNIT

CONTROL UNIT

INFORMATION DISTRIBUTION SYSTEM

CROSS-REFERENCE TO RELATED APPLICATION

This application is a continuation, of application Ser. No. 366,150, filed Jun. 14, 1989, now abandoned which application is a continuation-in-part of application Ser. No. 338,275 of Peter J. Sprague, Thomas H. Lipscomb and John R. Michener filed Apr. 14, 1989, which, in turn is a continuation-in-part of application Ser. No. 07/232,706 of Peter J. Sprague and Thomas H. Lipscomb filed Aug. 16, 1988 and entitled "INFORMATION DISTRIBUTION SYSTEM", both abandoned.

BACKGROUND OF THE INVENTION

The present invention relates to the provision of information services to multiple users and, specifically, to a method and apparatus for distributing information to users in the field and for accounting financially for the information distributed to, and selected and received by each user. More particularly, the present invention relates to the provision of a protected archival databank at the user site which permits rapid selection and retrieval of information. The present invention also relates to the provision of information distribution services wherein an alphanumeric character stream containing up-to-date information is serially broadcast to users in the field for selection by each individual user. In addition, the present invention relates to a method and apparatus for providing users with up-to-date information in a "seamless" manner from both an archival databank and periodic updates which are either broadcast or transmitted by storage media. And furthermore, the present invention relates to a method and apparatus for controlling and monitoring the access to information by a plurality of individual information users.

Various information services are available which provide individualized up-to-date information to a user. For example, electronic mail services are available via telephone lines to users of computer terminals. These mail services are based, financially, on either a flat rate subscription or, like dial-up database search services, a user fee which is dependent upon the amount, time spent and type of data provided to the individual user. However, these electronic mail and database search services are costly because the separate information transfers tie up central computer facilities and telephone lines.

Other current information services simply provide a stream of information which is broadcast over AM, FM, TV or satellite channels via cable or electromagnetic radiation. For example, continuous weather broadcasts and sales information provided by retail merchants are available to cable subscribers for a flat fee. Also, stock quotations broadcast on an FM sideband frequency are available to persons having specially adapted receivers. Furthermore, weather and navigation information are provided by U.S. government FM broadcast stations on specially assigned frequencies.

Government weather and navigation information services are supported by public funds. However, the cable TV information services and the stock quotation service must be supported by charges to the user-subscribers. Cable TV service, like the telephone, can be disconnected for non-payment, but the charge is a flat rate for all subscribers. Broadcast information services, such as the stock quotation service, cannot "unplug" a subscriber in this way. The information is therefore available to any user who has a suitably adapted receiver, whether or not they have a subscription to the service.

In considering information distribution services, it is helpful to distinguish between "archival" information, as may be contained in a large databank, and current, up-to-date information, which may be distributed in a serial data stream by telephone line, cable or RF broadcast, or via inexpensive storage media physically sent to the user. The former type of information has classicly been made available from large, on-line, computer databases and distributed by a time sharing system which may include a local area network (LAN), telephone lines, duplex cable, microwave or satellite transmission lines. With the advent of high density storage media such as the compact disk, it has become convenient to furnish significant quantities of archival information on compact disk read only memories (CD-ROMS). CD-ROMS, and other similar high density media can be supplied to users via the U.S. Postal Service, United Parcel Service, Federal Express, or the like.

It is presently the practice of information providers to charge a one-time fee for the information stored on such high density media. The charge for a typical CD-ROM containing, for example, the entire works of Shakespeare must necessarily be prohibitively expensive to many users since the entire value of the information has to be recovered at once. This high initial charge has the effect of limiting the number of potential customers for such information, thereby reducing the user base upon which the information cost can be amortized. This has the effect of maintaining the information charge at an inordinately high level, a "Catch 22" situation which is disadvantageous for both the information provider and the user.

The provision of archival information via high density media which can be read at the user site leaves open the question of periodic updates of current information. The high density media themselves are too expensive to be frequently replaced by media containing the current updates, nor are such updated media necessarily required. It is conceivable to issue "editions" of the archival storage media (e.g. high density CD-ROMS) at longer periodic intervals (e.g. yearly) and to issue incremental updates to this distributed databank to maintain its currency on a frequent basis (e.g., daily, weekly or monthly). The current, update information can be supplied via telephone lines, broadcast channels, or inexpensive low density media such as magnetic tape or floppy disk, as frequently as is required and the information contained on these media may be stored in the user's system (for example on a hard disk memory or optical read/write memory).

In the user search and retrieval from this repeatedly updated databank it is desirable to provide a "seamless" source of information so that the user need not know where the information is actually stored. In such a system, the type and nature of the storage media are said to be "transparent" to the user, who only sees the entire, updated databank as a unit. To the user, therefore, the two types of information described above—namely the archival databank stored locally on a high density media and the current, updates stored locally on lower density media, are preferably indistinguishable.

SUMMARY OF THE INVENTION

It is a principal object of the present invention to provide a low cost, personalized information service.

It is another object of the present invention to distribute vast quantities of information to a user site, both as an original, one-time archival databank and as periodic updates on a continuing basis.

It is another object of the present invention to provide and maintain a local databank at a user site which may be accessed by the user, as desired, in a seamless manner.

It is a further object of the present invention to provide a periodically updated databank, on site to a user, so as to minimize telephone usage and central computer processing time.

It is a further object of the present invention to provide a system for financial accounting of information distributed to, and selected and received by a user.

It is a further object of the present invention to provide a system for accounting financially for information distributed to, and selected and received by a user which permits a user to conveniently "charge through" the use of the information to the user's separate accounts or clients.

It is a further object of the present invention to provide a system for distributing information to a user which is extremely secure from attack and tampering by a third party and/or by the user him/herself.

It is a further object of the present invention to provide a system for accounting financially for information distributed to, and selected and received by a user which accounting system is extremely secure from attack and tampering by a third party and/or by the user him/herself.

It is a further object of the present invention to provide a system for controlling and monitoring access to information by a plurality of individual information users.

It is a further object of the present invention to provide an information distribution system which has certain information storage capability of its own but which is capable of obtaining information from outside sources such as a local area network (LAN) file server or a dial-up database.

These objects, as well as further objects which will become apparent from the discussion that follows, are achieved, according to the present invention, by providing at the user site:

(a) a first, protected storage device, such as a high density storage medium and reader, for storing information for subsequent selection and retrieval;

(b) a second storage device, such as a random access memory (RAM) or hard disk drive, for storing information to be received by the user;

(c) a device, such as a programmed microcomputer, for selecting and retrieving information from the first storage device and for transferring such information to the second storage device; and (d) a device, such as the aforementioned microcomputer, for accumulating use fees for the information transferred to the second storage device so that the user can be charged for the particular information that is received and used.

Conceptually, the second storage device thus becomes the "conduit" for monitoring the use of information: both archival and update information. All information placed in, and passing through this conduit is charged to the user. After placing the selected information in this second storage device the user may direct that it be supplied to a hard copy reproduction device such as a printer, to another computer via an SCSI bus or local area network, to a remote location via a telephone line, cable or other transmission link, or even to another storage device, such as a hard disk.

The charge for the information selected and retrieved from the first storage device and placed in the second storage device may be based on the number of alphanumeric characters, number of words, or some other unit of measurement. Preferably, and in accordance with a particular feature of the present invention, the use fee for the information is based on a so-called "information package", hereinafter sometimes referred to as an "IP". Thus, the information stored in the first storage device may be arranged, and is retrievable as a plurality of information packages (IP's), and the user is charged in accordance with either a standard use fee for each IP, or in accordance with a specific use fee associated with each different IP that is transferred to the second storage device. To facilitate the charge by use fee, each IP is preferably provided with a "header" portion of the package which may include such information as its identification (title, author, publication date, abstract and the like), its length, and the specific use fee associated with that IP. The header identification information is useful for search purposes as well as to permit a user to scan the subject matter of an IP before selecting and retrieving the entire IP.

The user fee charged for each information package that is transferred to the second storage device may thus be a specific use fee associated with the respective IP; a standard use fee for each IP (irrespective of the identity, type or length of the IP); a class-dependent IP which is the same for all IP's of a common class, but is different for IP's of different classes; and/or a length-dependent user fee which is determined by the length of the information transferred to the second storage device. User subscription fees may be charged to cover all or a portion of the user fees charged for information of a certain type or class.

In accordance with a further feature of the present invention, the first storage device contains both archival information, which is transmitted to the user either on a one-time basis or at repeated intervals that are relatively long in time (e.g. one year), and current, update information which is repeatedly transmitted to the user at relatively short intervals of time (e.g. one day, week, month or the like). The current information, which comprises updates to the archival information, may be either continuously or intermittently transmitted from a central location to a plurality of user stations at remote locations as a serial data stream or provided via inexpensive low density storage media.

The user stations are operative to select data from the data stream or low density media and store the selected data either in the first storage device (if it is to update the archival information) or the second storage device (if it is to be immediately used). Each user station also accumulates charge information corresponding to the selected information that has been deciphered and stored in the second storage device (protected information stored in the second storage device will not be billed for until it is decrypted). In this way, the user can be charged for the particular information that was selected, received and used.

According to still another feature of the present invention, the first, protected storage device includes one or more of a CD-ROM, a hard magnetic disk, magnetic tape, optical tape, electronic paper and an optical read/write memory. The second storage device includes one or more of a random access memory (RAM), such as a semi-conductor dynamic RAM, and a hard disk memory.

According to still another feature of the present invention, the accounting function of the information distribution system is implemented by a device, such as a key pad, for entering a user-specified account identification. In addition, the device for accumulating use fees is made capable of storing this account information in association with the identity of an IP that is transferred to the second storage device (i.e., information for which a user fee is charged).

According to still another feature of the present invention, the archival information as well as the current information updates which are stored in the first storage device are encrypted to prevent access to this information by unauthorized persons, including users who are deliquent in payment.

According to a still further feature of the present invention, the user apparatus includes a telephone line interface, such as a modem, and is operable to transmit the accumulated use fees via the telephone interface and a telephone line to a host computer at a central accounting (and billing) office. This host computer is presumably operated by the information service company which provides an distributes the information to the users and keeps financial track of the information selected and used by the users.

The transfer of financial accounting information may be automatically initiated, or initiated by a telephone or broadcast inquiry by the information service company. If automatically initiated, the accumulated use fees may be transmitted spontaneously and periodically at prescribed intervals. Alternatively, or in addition, the accumulated use fees may be transmitted spontaneously when the accumulated fees reach a prescribed amount.

As is indicated above, the first, protected storage device may contain both archival and current, update information which is available to the user in a "seamless" manner. To acquire the current, update information, according to a still further feature of the present invention, the system further includes a broadcast receiver for receiving information transmitted from a remote location and for storing the transmitted information in the first storage device. This broadcast receiver may be an RF receiver, for example, for receiving information broadcast via satellite or by a local broadcast station from the remote location. Preferably, the information is transmitted during the vertical blanking interval of a television signal or on an FM sideband in accordance with well-known principles and using commercially available equipment. The broadcast receiver may also provide a cable interface for information which is transmitted (broadcast) via cable from the remote location or from a local satellite receiving station.

According to still another feature of the present invention, each IP received from the remote location includes an IP-identifying header which facilitates the selection of that information which should be stored for future use in the first storage device. For example, this header may identify the source of the IP, or the class or type of the IP. In addition, the header may contain an abstract of the IP which can be tested for key words which are of interest to the information user. If an IP is selected for storage, it may be stored on electronically readable, high volume media such as a hard disk, floppy disk or streaming tape.

According to still another feature of the present invention, the IP's stored in the first storage device each includes an unique IP identifier, such as an identifying title, author and source citation or an identifying number code. The accumulator device stores the identifier of each IP that is transferred to the second storage device. This IP identifier information can be made available to the user and/or can be transmitted via a telephone line to a host computer at a central accounting office so that use statistics may be compiled and payments may be made to the creators of the respective IP's.

According to a still further feature of the present invention, the accumulator device encrypts the information stored therein, such as the accumulated use fee information and the IP identifier information, which is transmitted to the central host computer. Such encryption makes it difficult, if not impossible, for a user to fraudulently change the IP use information so as to reduce the user fees.

According to a still further feature of the present invention, the system includes a keyboard or the like for entering the personal identification code (PIC) of each system user. By requiring each user to enter a PIC, the system can control and monitor the information distributed by the system. In particular, the system stores the PIC in the accumulator device in association with each IP identifier and user fee corresponding to an IP transferred from the first storage device to the second storage device. A record is therefore kept of the identity of each IP obtained from the system and the identity of each user who obtained that respective IP.

According to a still further feature of the present invention, the system includes a device for storing the PIC of all users who are authorized to receive information and a device for comparing the PIC entered by each user with the PIC's of the authorized users and for enabling the operation of the system if the PIC entered by a user is equal to a PIC of an authorized user. In this way, the system is capable of limiting the access to information to only those users who have previously been authorized.

According to a still further feature of the present invention, at least a portion of the information stored in the first storage device is encrypted and the system comprises a device for decrypting the information selected and retrieved. Alternatively, or in addition, the first storage device can include a mechanical or electrical "lock", or some other conventional security device, for preventing the information stored therein to be read out by anyone other than an authorized user. The lock preferably includes a mechanical or electrical "key" to which only an authorized user has access.

Similarly, at least a portion of the information received by the receiving device is encrypted and the system includes a device for decrypting that information, received by the receiver, which is selected and retrieved.

As a consequence of the encryption and security devices, as described above, the information transmitted, received and/or stored by the system remains secure against unauthorized use and unlawful copying.

According to a still further feature of the present invention, the system includes a device, such as a printer or facsimile machine, for producing a user-visible copy of the information transferred to the second storage device.

According to a still further feature of the present invention, the system includes a telephone line interface, a third storage device and a device for calling a remote host computer via the telephone line interface and requesting transfer of selected information from that host computer to the third storage device. Preferably, the system also includes a device for storing a transaction record of the information transferred from the host computer to the third storage device.

If the information transferred from the host computer is arranged in a plurality of IP's, the transaction record can include the identity of each IP that is transferred to the third storage device. If the host computer includes at least one database, the transaction record can further include the identity of the database from which the information is transferred to the third storage device. If the system includes a device for entering a user-specified account identification, the transaction record can also include this account identification in association with the identity of each IP that is transferred to the third storage device.

Preferably, the information stored in the third storage device is encrypted for subsequent decryption by the system. In the alternative, or in addition, the third storage device itself includes a security device, such as a mechanical or electrical "lock", for preventing the information stored therein to be read out by anyone other than an authorized user.

According to a still further feature of the present invention, the system includes a local area network (LAN) interface, a third storage device and a device for accessing a data storage file server via the LAN interface and for requesting transfer of selected information from the data storage file server to the third storage device. Preferably, a transaction record of the information transferred from the data storage file server to the third storage device is maintained in much the same manner as the transaction record described above in connection with information transferred from a remote host computer.

Preferably also, security of the information obtained from the file server is maintained by encrypting the information stored in the third storage device and/or by providing a security device, such as an electrical or mechanical lock, for preventing the information stored in the third storage device to be read out by anyone other than an authorized user.

According to a still further feature of the present invention, the system may be employed to transmit selected and secure information from the user's location to a remote location, for example via a telephone line interface and telephone lines. A transaction record is maintained of the identity of all IP's that are transferred to the remote location and the accumulator device accumulates use fees for the transfer of this information. Preferably, all information transferred in this way is encrypted during transmission and decrypted at the receiving end. If the information is not encrypted while stored in the system, the system encrypts this information prior to transmission.

Similarly, the system may be used to receive and decrypt IP's which are transmitted to it from a remote location and to generate a transaction record of each such transmission.

Summarizing the above, the underlying concept of the present invention is to distribute both archival and current information to a user in a seamless manner and to charge the user individually for each piece of information (character, word, information package or the like) which is accessed from a protected storage device at the user site. This concept allows the wide-spread distribution of the protected information (by physical distribution of high density and low density storage media as well as by broadcast) at an extremely low entry cost to the user, because the cost of the service need not be recouped by a one-time fee.

The combination of archival information storage and retrieval with broadcast or distributed updates of the archival databanks is alone of significant importance to an information user. The ability to provide such a service with a small or no initial fee and to charge the user only for the information actually selected from the databank—i.e., providing the information on a "pay as you go" basis—brings this information service within the financial reach of virtually every person or legal entity that has a need for the information.

For a full understanding of the present invention, reference should now be made to the following detailed description of the preferred embodiments of the invention and to the accompanying drawings.

DESCRIPTION OF THE PREFERRED EMBODIMENTS

News Service Embodiment

Figure 1:
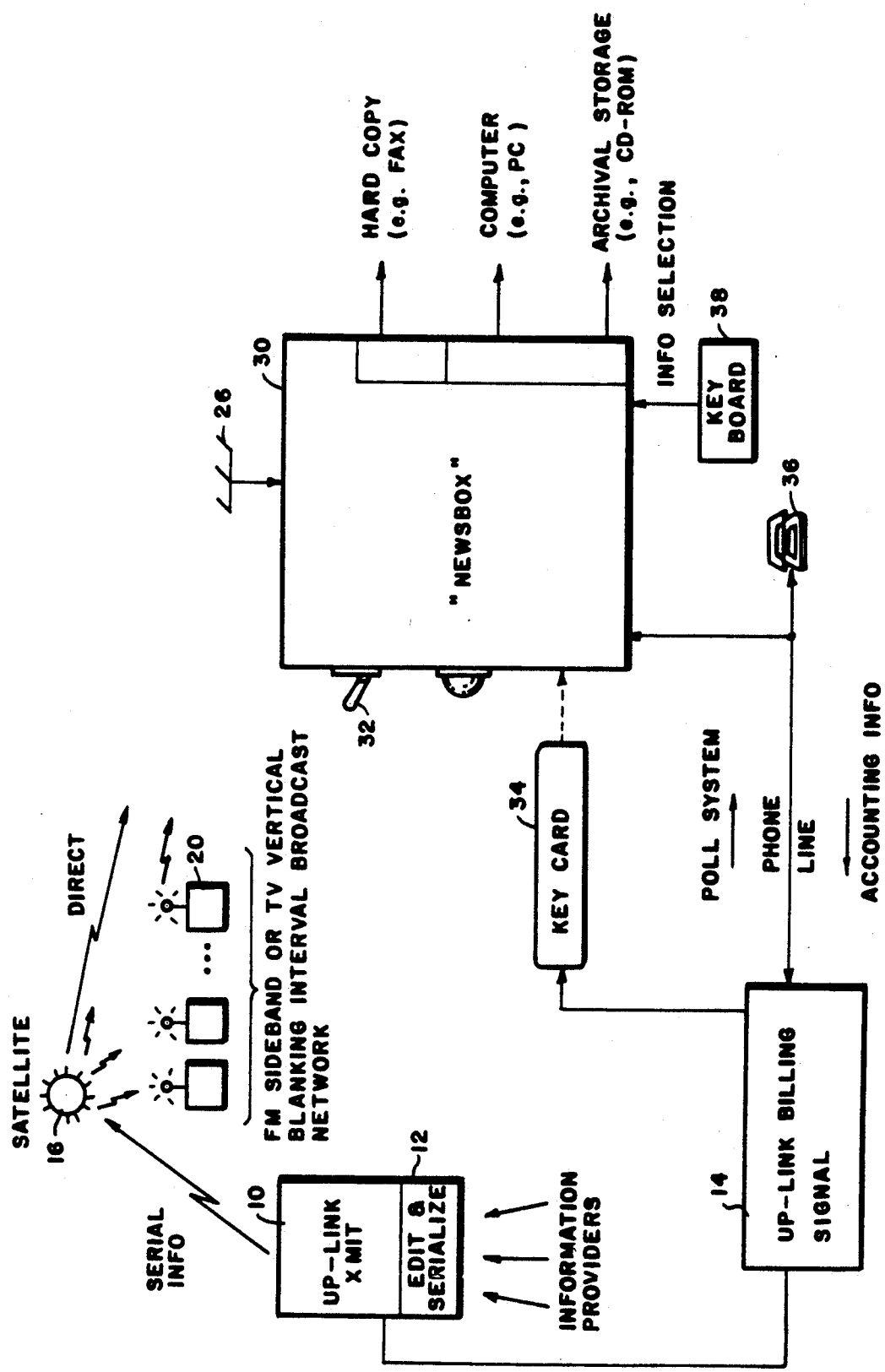
FIG. 1 is a functional block diagram of a broadcast information monitoring and retrieval system in accordance with one preferred embodiment of the present invention.

A presently preferred embodiment of an information distribution system according to the present invention, that provides personalized news service, is shown in FIG. 1. News reports, stock market quotations, sports scores and analysis of financial and political trends from sources such as news magazines, newspaper reports and press releases, are all collected at a news service bureau or base station 10. At this base station 10 they are edited, compressed and serialized to form a serial data stream that conforms to the transmission format used by the system. Also, in addition to the various information sources 12, a signal from a signal source 14 is also periodically added to the data stream for use in the customer accounting operation, as will be described in detail below. In particular, one function of this signal source 14 is to add to each block of information the cost of this block if it is selected by a customer. The data stream is then encrypted before being transmitted to communications satellites 16.

Each communications satellite 16 then retransmits the data stream to local FM or TV stations 20 and directly to customers who are equipped to receive satellite communications. The local broadcast stations 20 retransmit the compressed and encrypted data as FM side-band information or as information carried in the vertical blanking interval of the video signal to customer terminals 30. The signal received by the customer's antenna 26 from the satellite 16 or the local broadcast station 20 is then processed by the customer terminal 30.

The customer terminal 30 is only operable when a key card 34 containing the encryption code currently in use, and any other information necessary to permit that particular customer terminal to decode the transmitted data stream, is inserted into the customer terminal 30. For instance, each customer terminal may require a code that uniquely identifies that terminal to be present on that key card, in addition to the encryption code. Alternatively, an update of the encryption code for the specific terminal can be supplied at periodic intervals by telephone transmission. For this purpose, and for other purposes which will become clear from the discussion that follows, the customer terminal also includes a telephone interface modem 36 and a user control keyboard 38.

Figure 2:
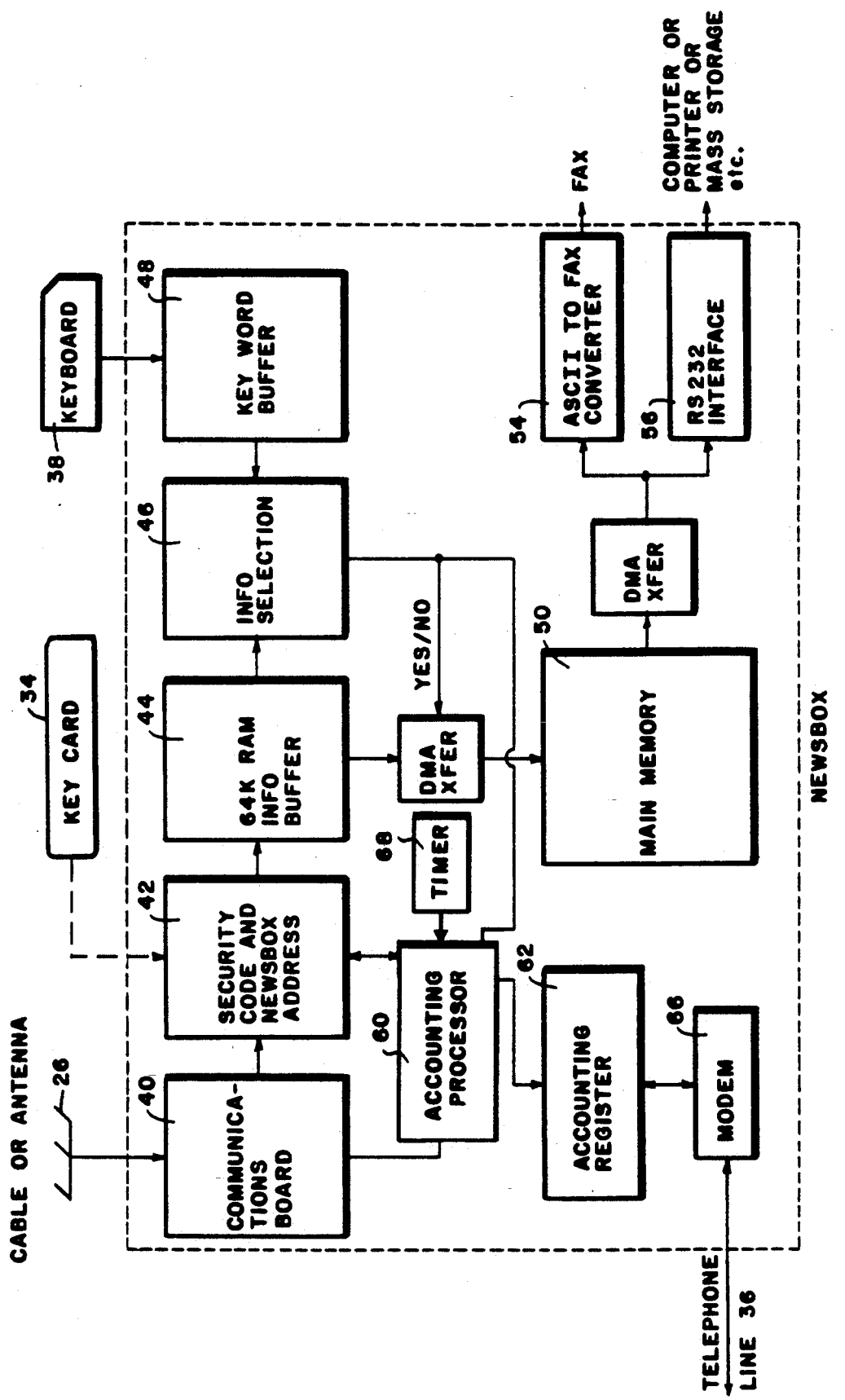
FIG. 2 is a functional block diagram of a user station employed in the system illustrated in FIG. 1.

Inside the customer terminal 30 a communications circuit 40, shown in FIG. 2, strips the data stream from the carrier signal transmitted by the satellite 16 or the local station 20. The data stream is then processed by the security circuit 42, which is controlled by the key card 34. The security circuit uses the machine-readable cipher information on the key card 34 to retrieve the clear text of the data stream that it receives. The key card 34 may also provide machine-readable information that controls the operation of the communications circuit 40 so that the customer terminal 30 may be used to receive more than one data signal. For instance, the news service bureau 10 may provide an additional channel that carries only specialized information such an scientific, medical, or legal reports, in addition to the general news channel.

The data output by the security circuit 42 represents clear text, without the compression and encryption that was added when the information was transmitted, accompanied by billing and statistical usage information which remains encrypted. The format used by the system divides the data stream into blocks of information. These blocks of information are temporarily stored in an information buffer 44. While a block of information is stored in the information buffer 44, a comparator 46 compares the clear text in that block of information to the key words and word patterns stored in the key word buffer 48.

Information is input to the key word buffer 48 from the keyboard 38 as words or as word patterns—such as the word patterns conventionally used to search commercial data bases, which are defined by combinations of Boolean operators and word location parameters.

If the comparator 46 finds the key word or word pattern in the block of text, that block of information is transferred immediately to a main memory 50. If no correspondence is found, the block of information in the information buffer 44 is written over, once the information buffer is full, by the next block of information transferred from the security circuit 42, without being saved in the main memory 50.

The blocks of information in which the selected key words or word patterns have been found may be accumulated in the main memory 50 and/or passed immediately to one of a number of different display, reporting or archive devices. These devices may include one or more video displays, voice synthesis devices, telefax equipment, printers and optical or magnetic recording devices.

In the preferred embodiment shown in FIG. 2, blocks of text from the information buffer 44 that are transferred to the main memory 50 may be transferred by direct memory access to a signal converter 54 which changes the standard ASCII format in the block of text to a facsimile format for use by a facsimile printer, and to an RS-232C asynchronous data port 56. Other formats, such as Postscript, may be used for output of text and image blocks.

The information transferred to the main memory 50 is also simultaneously supplied to an accounting processor 60 which strips off the encrypted billing and statistical usage information included in each selected text, and passes this information to an accounting register 62. The accounting register 62 accumulates charges and also may accumulate simple statistics on the types of data selected by the customer. Alternatively, statistics may be accumulated and maintained by the central accounting department of the news service bureau 10.

When a signal from the accounting signal source 14 is received by the communications circuit 40, the accounting processor 60 receives a signal from the communications circuit 40 that causes the accounting processor 60, with the aid of a modem 66 at the customer terminal 30, to dial a predetermined telephone number which may be provided on the key card 34 in machine-readable form. Dialing this telephone number establishes a data link to the accounting department of the news service bureau 10. Alternatively, the customer terminal 30 may be continuously connected directly to a telephone line so that all customer terminals 30 can be automatically polled sequentially by the accounting department to retrieve the charge and usage information. Cryptography and/or cryptographically protected checksums are desirable to protect the accounting transmission from interception and manipulation.

In this embodiment the accounting processor 60 is connected to a timer 68 which turns on an indicator light 64 as a warning to the customer that the key card 34 for the customer's terminal 30 will become obsolete in a given period, such as ten days. When the customer's payments are current, the accounting department will authorize the customer's continued use of the customer terminal 30 by issuing a new key card 34 required to operate that particular terminal after the next change in the encryption of the transmitted data. The new card can be mailed to the customer for use when the indicator light is actuated. The change in encryption may be announced by a message that is encrypted using the obsolete cipher, and transmitted in a form that causes it to be output by all terminals still using obsolete key cards. Alternatively, the message may be supplied periodically, or in response to an encryption code mismatch detected in the security circuit, by the accounting processor 60 to the main memory 50.

The message can be a standard notice requesting that the customer call the accounting department, or a message tailored by the accounting processor 60 to the individual account by reference to the billing information stored in the accounting register 62. The message stored in the main memory 50 is then communicated to the customer through the facsimile converter 54 or the RS-232C interface 56 shown in FIG. 2.

The encryption of the transmitted data stream is changed periodically to discourage attempts to circumvent the security provisions of the system, as well as to facilitate timely payments by customers. This method of changing the encryption, and the use of individual, encrypted reporting channels for accounting and individual, periodically changed key cards, provides much greater security for the information distribution operation than has been previously available. This reduces the risk of operating a large-scale information distribution system without prompt financial support by customers and avoids the high overhead costs of dial-up data services.

Figure 3:
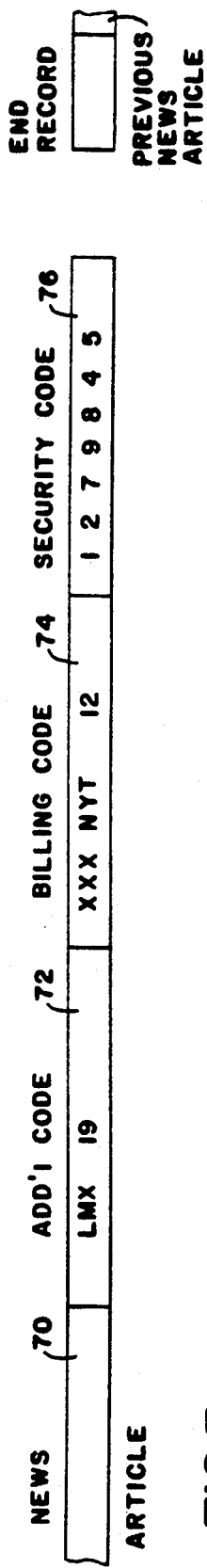
FIG. 3 is a representational diagram of the data stream format used in the system illustrated in FIG. 1.

FIG. 3 is a schematic representation of the format of the data stream transmitted by the system in accordance with a presently preferred embodiment of the invention. In FIG. 3 a news article 70 is transmitted as a serial block of information preceded (or followed) by a header section containing an additional code 72 which includes, for instance, the statistical reference data used by the news service to analyze customer preferences or a linking code that permits items that exceed the capacity of the information buffer 44 to be selected as a whole, rather than permitting the comparator 46 to select only part of that news item.

The additional code 72 is preceded (or followed) by an encrypted charge code 74 which the accounting processor 60 uses to accumulate customer charges in the accounting register 62. The charge code 74 is preceded (or followed) by a security code 76 that permits access to the data to be restricted to a particular subset of user terminals by disabling the decoding of the text by the security circuit 42. Alternatively each separate data service may use separate encryption keys. Each information header section may include a prefix in the information ID code number to designate the service. When the key card 34 is out of date, the security circuit 42 will also be unable to decode the information signal provided by the communications circuit 40.

Figure 4:
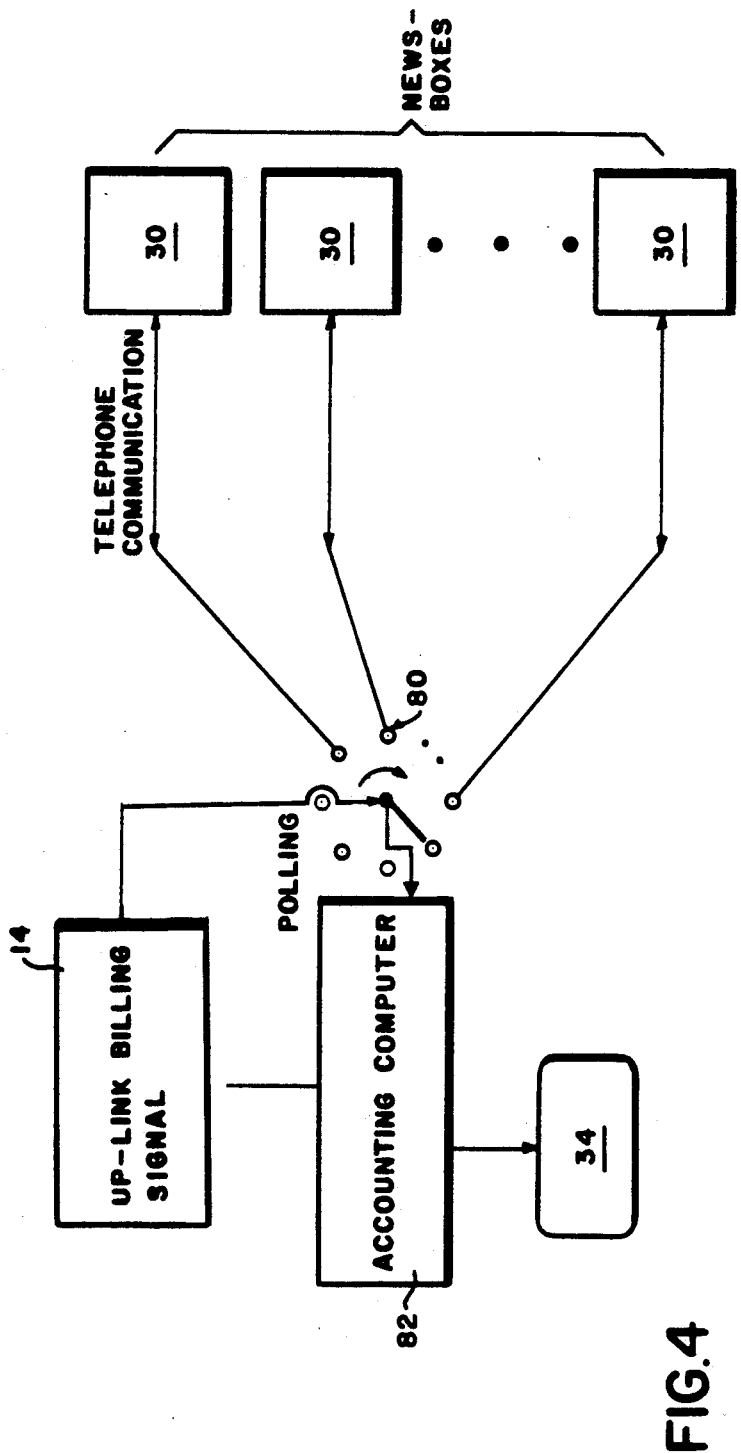
FIG. 4 is a functional block diagram of the central transmission and accounting facility employed in the system illustrated in FIG. 1.

FIG. 4 shows an alternative embodiment of the accounting functions indicated in FIG. 1. In FIG. 4 the customer terminals 30 are directly linked to telephone lines via modems and are automatically polled by an electronic switch 80 in the accounting department on a monthly basis. The accounting computer 82 tracks the status of the customer's account and, when payments are current, periodically issues the replacement key cards 34 that are necessary for continued use of the customer terminal 30.

General Concept of Invention

Publishers of technical, commercial, and business information have fought for the control of royalty income since the commercial advent of the photocopier. In the case of many of these publications, the result has been a spiraling subscription rate that threatens the existence of the publications themselves. The present invention makes it possible to change the economics of this information distribution system and make far more information far more easily available than is currently the case. This invention has the potential to alleviate the problems of storage, copying, and copyright royalty payments that are common headaches for many libraries. If broadcast capabilities are utilized to perform incremental updates to a distributed databank, the stored databank can be efficiently updated to maintain its currency between issues of archival storage media. The present invention has the potential to eliminate paper handling for specialized journals/publications while at the same time allowing archival copies of the information to be stored at designated repository libraries.

As would be expected, the specialized user communities have developed highly sophisticated techniques for accessing the information in their information sources. For technical users, these typically involve journal, article title, author, date, keywords provided by the author(s), and a text search on the abstract, which is available in commercial, computer search databank. The legal community uses, among others, headnotes and citation trails, as well as specialized computer databanks. Unlike the situation in the technical publishing community where new articles do not invalidate older articles, although they may prove the older articles to be in error, new legal decisions and laws can invalidate old case law and statutes rendering the latter obsolete. Correspondingly, the legal community has developed techniques to adapt to constant changes in the law. Organizations having to deal with governmental regulations and requests for proposals are subject to even greater information turnover, since this information can be changed by statute or executive action. Efficient data updating is mandatory for the viability of these businesses. Timely distribution of update information between reissues of the reference databanks are critical for these users. Omission protocols are required so that a user will realize if a distribution is missed and can obtain the information by other channels. In general, such search and information handling tools are well known and do not require a detailed discussion here.

RF broadcast is a very inexpensive medium for distributing information, as long as there is enough demand to cover the fixed expenses. In urbanized areas single sideband FM broadcasting is available with a data capacity of 19,200 baud/channel. Such a channel has a capacity of 170 MBytes/day (20% transmission overhead, no repeats). This is adequate for the transmission of a large amount of text based information even assuming multiple transmissions of such information for error correction. It is inadequate, however, for the transmission of large amounts of image based information. Moderate quality color images require about 128 KBytes each. Black and white images require somewhat less storage. High quality, full page, color graphics require far more capacity, 1-3 Mbytes per picture, after compression. In the case of very narrow interest/very small niche markets, physical distribution of magnetic or optical storage media could be the most cost efficient way to update the databanks. Unless much higher bandwidth channels can be utilized, physical media distribution may also be the most cost-efficient means of distributing image intensive information, particularly if it is of interest to a relatively small market.

The central concept of the present invention is to provide a system (method and apparatus) for distributing information to a user on a pay-per-package basis rather than a pay-per-subscription basis, although any desired mix of subscription and pay-per-package billing arrangements may be accommodated. To implement a subscription service, the invention contemplates the distribution of subscription specific broadcast keys or by having the central accounting facility not bill individually for articles that satisfy the substitution criteria. The apparatus at the user site can examine the information package ("IP") header block for the classification and description information required to determine the subscription classification. The apparatus can then decrypt and store any article within a specified subscription. Of course, the apparatus can also apply additional criteria to IP's within the designated subscription to automatically winnow the desired information. Similarly, free access can be given to a designated class of information or archival media by having the central accounting facility not bill for articles that satisfy certain criteria. It is even possible to combine the two billing modes if desired: requiring both a subscription charge and a per-package charge for information access. This may be done using a double encipherment system. Distribution keys can be changed and distributed on a monthly basis, allowing paid-up subscribers to remove the broadcast encryption from the broadcast information. However, access to the information would still require decryption using the appropriate keys, and billing on a per-package basis. Similarly, combined billing could be required for access to archival material. The refusal of decryption by the user apparatus when its accounting register is full, or when a specified time has passed since the last authorization, can prevent a user from abusing the system.

Most information research facilities, either private (such as research laboratories, law firms, etc.) or public (universities, medical institutions, etc.) require billing of expenses against clients, project budgets, or research areas. Correspondingly, they may employ accounting controls that allow them to track expenditures. This type of cost allocation can be effected with the information distribution system according to the present invention by means of a user entered billing code, or by the use of electronically read billing keys or cards, depending upon the level of trust in the user's organization. The retrieval unit would record both the article/reference retrieved and the requestor billing code/electronic key number in the accounting register. The monthly invoice to the institution can provide the billing breakdown, allowing itemization of expenses by billing codes. A user who did not want this information would not have to enter such billing codes. In essence, a billing code is a user supplied comment field, primarily for use by the user.

In order to bill individually for each IP accessed from the databank/datastream, it is mandatory to provide some kind of security so that users are required to use the system of the present invention to access the information. Since the high or low density storage media containing the information will be out of physical control after distribution into the field, where users may copy the media or transfer their contents to other electronic storage formats, it is preferable not to rely for security solely on the storage device at the user site. While effective security may be provided by using a storage device which requires the physical insertion of a mechanical or electronic key, or requires the electronic entry of a user identification number to activate the device, preferably at least a portion of the information distributed to the user is encrypted, and the user apparatus includes means for decrypting the information selected and retrieved by the user.

The high value of the protected data, the time available to attack it, and availability of matched ciphertext/plaintext data streams (whereby the ciphertext stream can be directly read from the enciphered disk, while the output of the decryption device is the cleartext stream) provides ample motivation and opportunity for sophisticated cryptographic assault. In addition to having to provide strong cryptographic protection, the data security technology used with the present invention is preferably very fast since it must deal with data being read from archival storage devices. Data rates on the order of 1 Mbit/sec (125 KBytes/sec) are desirable for this application. The combination of speed and security required for this market points to the use of dedicated hardware, such as a data encryption standard (DES) integrated circuit, for the cryptographic implementation. Intelligent use may also be made of data compression and message keys to hinder sophisticated search attacks upon the system.

As in the case of the information broadcast system described above, the security of the system billing controls and the assurance of the physical integrity of the user apparatus should be maintained. Controls to prevent the undetected alteration of phone line communications with the apparatus, or user modification of the apparatus itself, need to be very strong, since this is the easiest route of attack upon the system. It should be assumed that an attacker is monitoring all telephone communications and can interfere at will with the data stream on the phone line. This makes desirable the use of strong cryptographic block codes with error correcting coding to transmit commands to the user apparatus from the central accounting (billing) office, and cryptographic checksums to validate information sent from the user apparatus to the central accounting office. While the decryption key in each unit accessing the same information will be the same, individual user units will have their own individual identification numbers and communications keys.

Billing protocols are also preferably used prevent abuse of the system. The user apparatus would contact the central billing office on a regular schedule and/or when its accounting unit has crossed a set threshold. The user apparatus will not be able to decipher information if its accounting register is full or its internal clock is past a set time, displaying a message that it must contact central billing if it is to provide further access to the protected information. Upon contacting the central billing system, the user apparatus downloads the list of IP's retrieved and deciphered and their associated billing codes, if any, and a cryptographic checksum block to verify that the billing information was not interfered with (since an attacker could easily interfere with the communications on the telephone line). After verifying the billing information, the central billing office clears the accounting register in the user apparatus, and reloads subscription and broadcast keys, allowing the user apparatus to select, retrieve and decypher additional IP's. Communications from the central billing office to the user apparatus are also protected by cryptographic protocols.

To prevent echo attacks and frustrate crypto-analytic assault upon the user apparatus command channel, the central billing office preferably generates a random number (at least 8 bytes long) and supply it to the user apparatus in the header block of its exchange. A message key is generated by enciphering the supplied random number with the individual user apparatus communications key, which both the user apparatus and the central billing office know, using a strong block code as a transformation unit. The resulting block is used as the message encipherment/decipherment key. Commands and instructions, such as "clear the accounting register", or for reprogramming of the user apparatus, are then transmitted to the user apparatus after encipherment with this message key. It is very unlikely that anyone would break such a system, which is comparable in security to interbank money fund transfers. The attacker's knowledge of the random string that was enciphered to obtain the message key would be of no use. The individual user apparatus encipherment key would never be transmitted over the telephone line. It should be noted that all communications are also preferably protected by error correcting codes to minimize communications errors which would invalidate these exchanges.

The text portion of stored journal articles, government regulations, or legal reference material exhibit considerable similarity in the language from one article/reference to another. This allows for specific and highly optimized data compression techniques to be applied to the stored data. In the presently preferred embodiment of the invention the following scheme is used for English text: 128 common words and grammar structures are encoded in one byte, with the 8th bit reserved as a flag to denote the use of two-byte encoding. The text is transmitted by first transmitting the message specific dictionary, followed by a block of 8 and 16 bit pointers, which point to common words (8 bit) or to common or message specific words (16 bits). 32K words can be encoded with this scheme before exhausting the dictionary. These words can be distributed as desired among a fixed dictionary and a message specific dictionary. The choice of this distribution is subject to tradeoffs as to search efficiency, fixed dictionary size, and message dictionary size. For example, 24K words can be stored in the common usage dictionary with 8K words reserved for message/article specific vocabulary. The cost of this approach is merely the memory requirement for the reference dictionary. If the average length of a word is 8 bytes, 192 Kbytes are needed to store the common usage dictionary.

In an enhancement of the information distribution system according to the present invention, it is necessary to include command codes to instruct the system that graphical data or continuous tone images are starting, notifying the system of the appropriate image type so that the appropriate decompression techniques can be applied. It is also possible to define shift characters so that unique character strings can be left in place rather than being placed in the message/article vocabulary. Such embeddings could be desirable for the inclusion of numerical tables or other unstructured data items, which would not be subject to use as search terms. Numeric data can be easily compressed from its ASCII representation since any individual decimal or hexadecimal digit can be represented by a 4 bit "nibble", allowing a factor of 2 increase in packing density.

Archival Information Distribution System Embodiment

Figure 5:
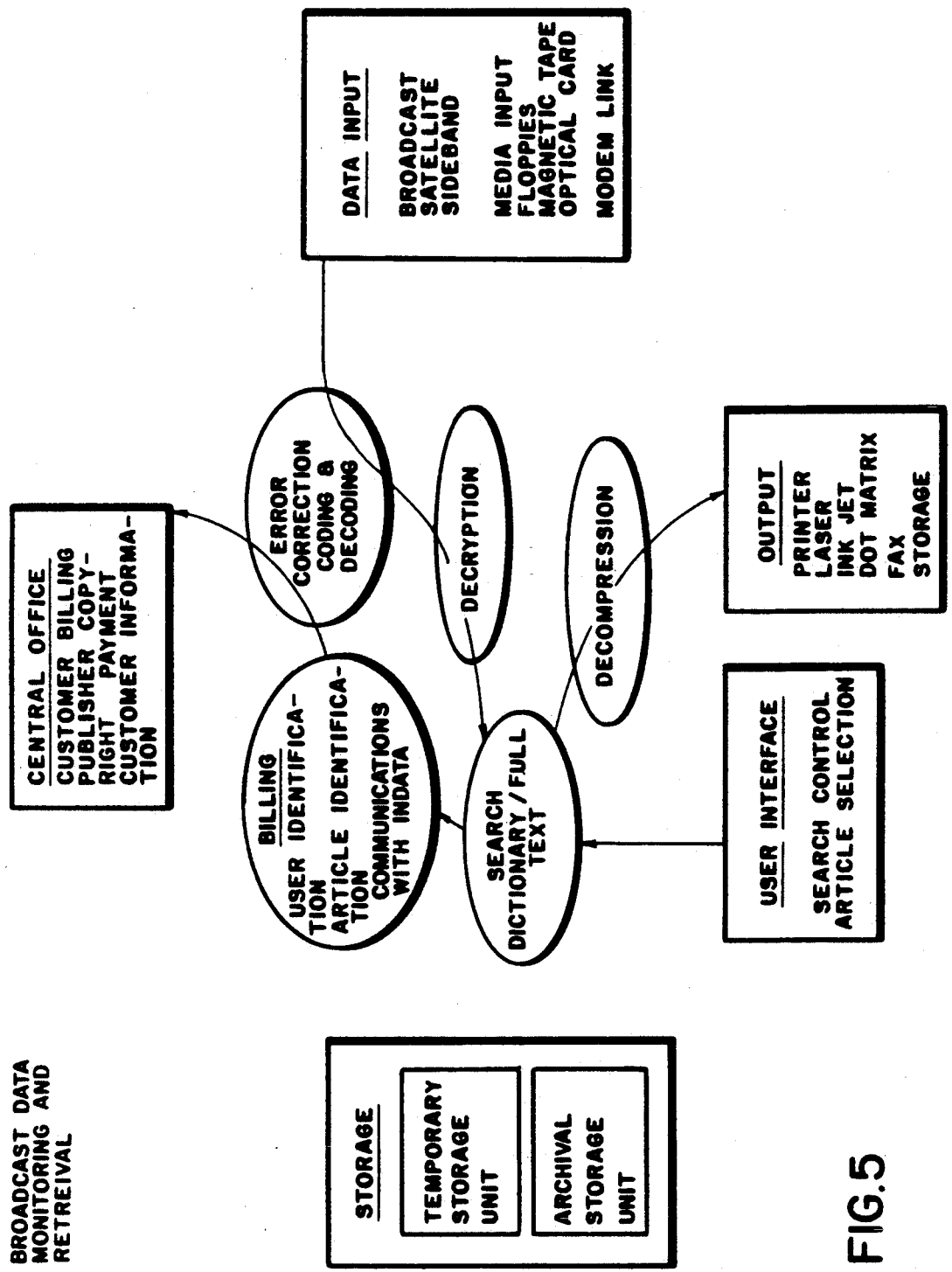
FIG. 5 is a representational diagram showing the flow of information in the broadcast information monitoring and retrieval system illustrated in FIG. 1.

Before considering details of the system architecture it is important to review what functions it is called upon to perform. Following the information flow during processing is a good way of seeing how the functions partition in the user apparatus. A basic flow chart for the user apparatus, when used as a simple broadcast data receiver and filter, is shown in FIG. 5. Data is received by the broadcast receiver, which demodulates it, providing a digital data stream to the decrypt and decompression module. After correcting for transmission errors the data is deciphered. If the text matches the desired search criteria, the article/reference is unpacked, the billing information is entered into the accounting (billing) register, and the article is read into the output buffer for user printing or other use.

Figure 6:
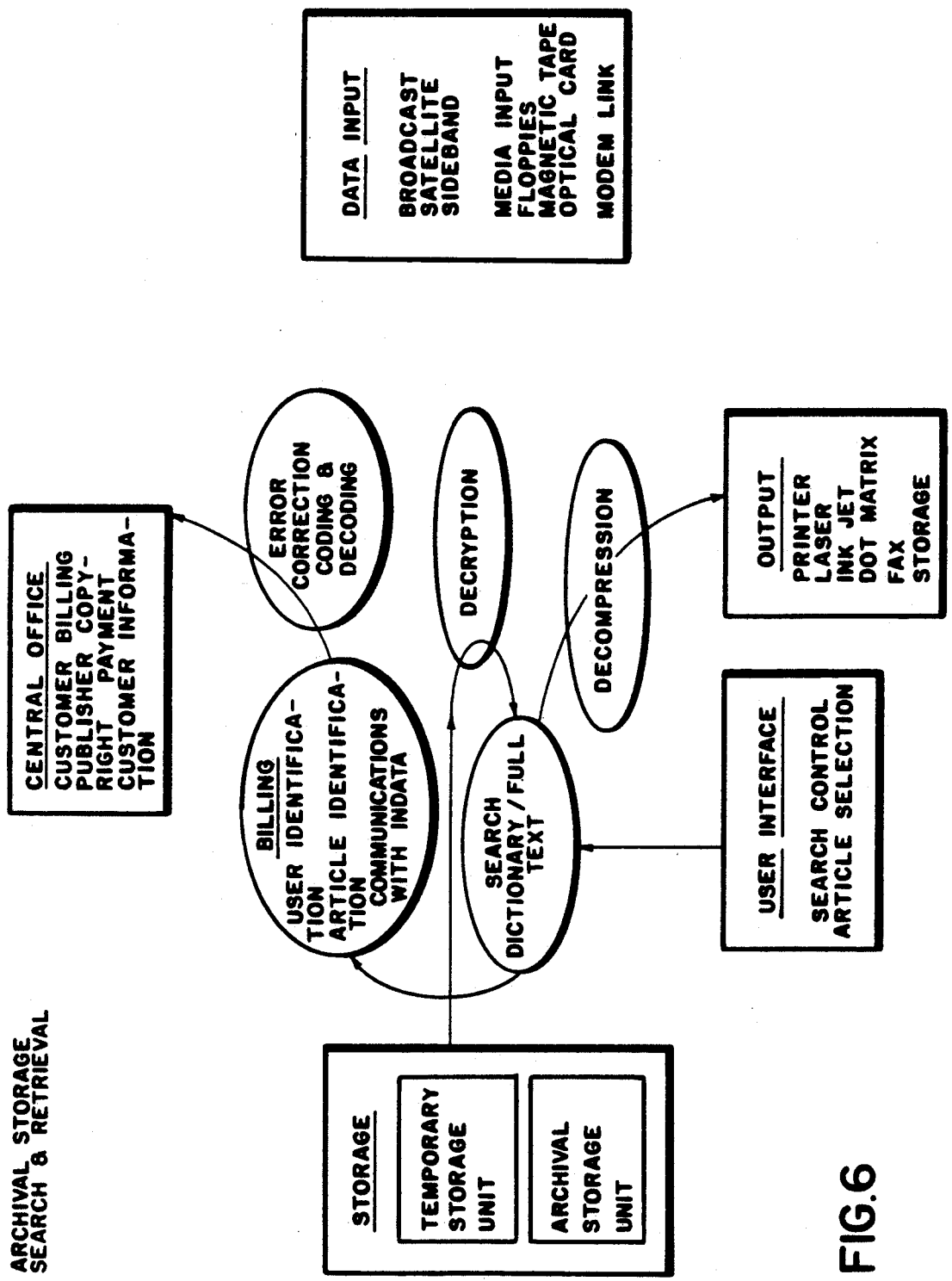
FIG. 6 is a representational diagram showing the flow of information in an archival information search and retrieval system according to the present invention.

The corresponding flow chart for the user apparatus when used as an archival information retrieval unit is given in FIG. 6. In this case the protected archival information is stored on high density media in conjunction with unprotected information. The unprotected information provides the primary access means for the protected information, comprising the indexes, abstracts, headnotes, citation trails, titles, and the like for all the protected information. The user normally uses this information to access the protected information. If necessary, the user could decrypt the IP and conduct searches on the full text of the article, but this is not likely to be common or necessary. Once the user has chosen an IP to access, the user (more particularly, the user's software) loads the enciphered IP into a buffer storage and instructs the user apparatus to decipher it. The user apparatus then enters the identification information into the billing register, reads the enciphered IP from the buffer, and writes the deciphered IP back into the buffer for the user to access it.

Figure 7:
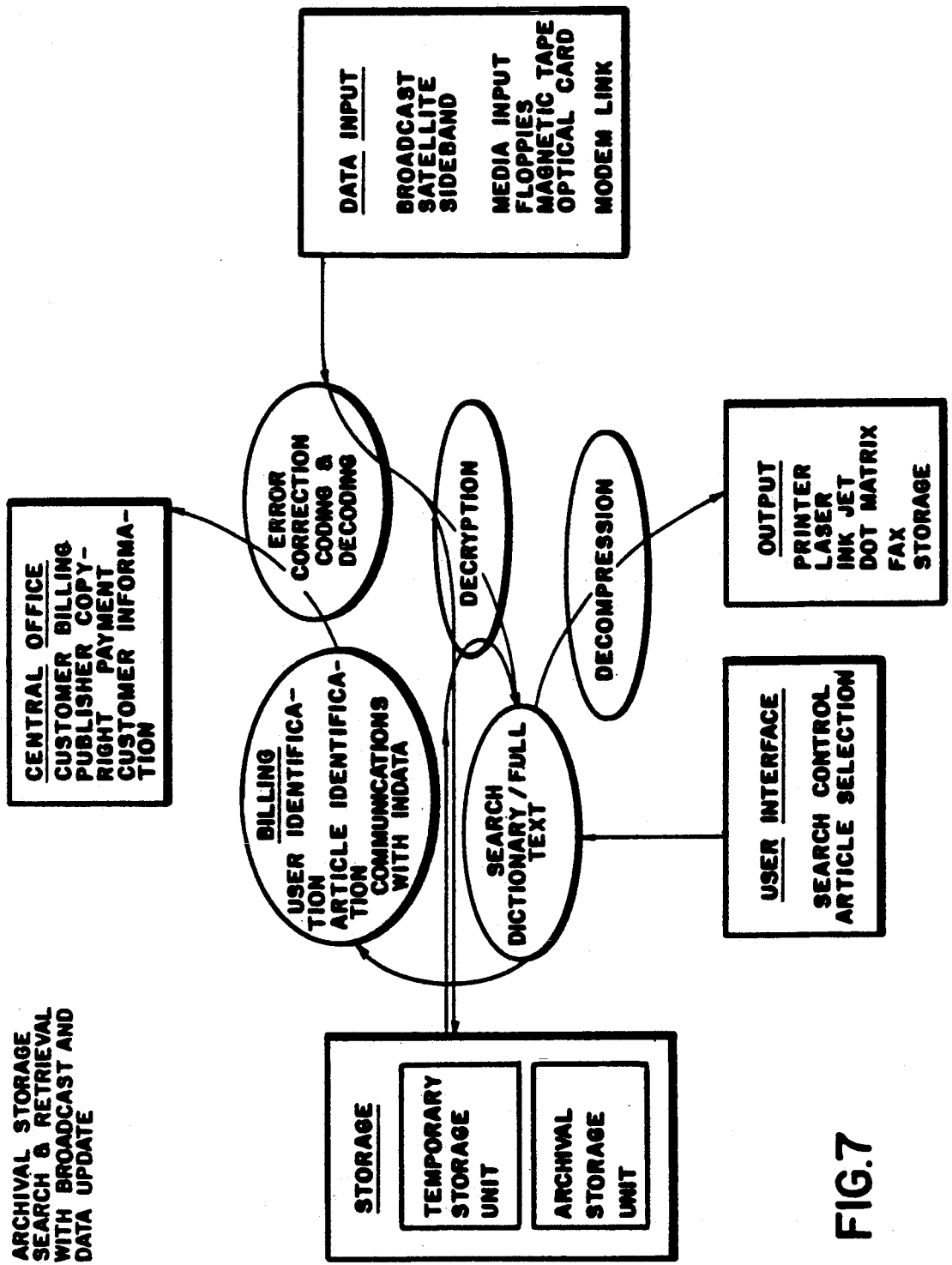
FIG. 7 is a representational diagram showing the flow of information in an archival information search and retrieval system according to the present invention which receives updates by broadcast and/or other media.

FIG. 7 shows a flow chart for the more complex situation where stored archival information is coupled with updating and broadcast search and retrieval; i.e. a combination of the two applications shown in FIGS. 5 and 6. In this case, the archival information can be updated either by information broadcast or by physical media distribution. In either case, update information is stored in a buffer unit, probably a hard disk or read/write optical storage unit. The user's search software accesses the buffer unit before accessing the archival media to determine if the information in question had been updated and, if so, to obtain the current information. In addition to allowing the updating of archival information, this application allows the search for and capture of information that meets chosen search criteria, as shown in FIG. 5. Because of the substantial storage resources that are available to the user unit in this situation, captured information can be easily stored for later manipulation and use.

It should be noted here that, with the exception of searching for words or terms within the enciphered information section, the search on databanks is performed by user software, on the user hardware. The databank is indexed to support the traditional search techniques used by the consumers of information (title, abstract, author, and keyword in technical works, headnotes and citation trail in legal publishing, etc). The databank will probably have the abstracts/headnotes, which are in cleartext in the databank, indexed in separate index files. This would allow word or term searches at speeds far in excess of the capabilities of the system retrieval speed itself.

The three principal components of the user apparatus, which will now be described in detail, are the broadcast receiver, the so-called "control unit" and the so-called "user interface unit" or, simply, "user unit". If current information updates are not broadcast to the user apparatus via electromagnetic radiation or cable but are transmitted (e.g. sent through the mails via low density storage media) it is possible to dispense with the broadcast receiver. Similarly, if the control unit is connected to a standard, commercial workstation such as the Apple McIntosh, the IBM PC or PS/2, or the Next microcomputer, it is not necessary to include a user interface unit.

Figure 8:
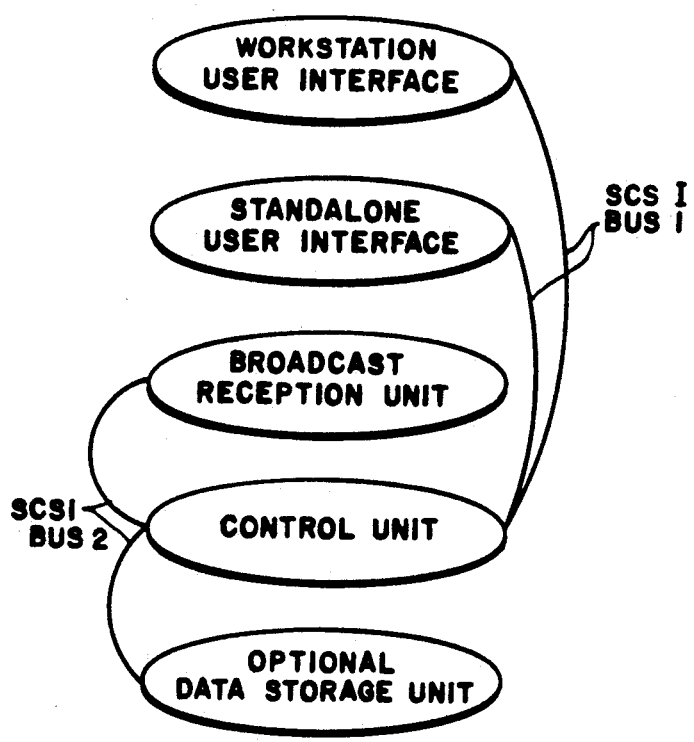
FIG. 8 is a representational diagram showing the block structure and connecting communication links employed in the information distribution system illustrated in FIG. 7.

The control unit, which is preferably separately housed in a compact metal box, contains the search engine, decryption circuitry, billing and control registers, and associated circuitry. This unit is common to all user apparatus simplifying the manufacture and support of the system. The control unit is provided with two SCSI interfaces: One SCSI interface communicates with the user workstation, which can be the either the standalone user interface unit or a standard workstation; the other SCSI interface supports the broadcast data reception unit and an optional data storage unit. The two-way communication capability of an SCSI bus allows the control unit to talk to the broadcast data reception unit, as well as vice versa, to reset the receiver if it loses synchronism and to set a receiver IP selection filter, if desired. The block structure of the communications of the control unit with other hardware components is shown in FIG. 8. Not shown in this diagram is an electronic key port in the control unit for billing authorization. This port is implemented by another serial line or by a parallel key port.

If the broadcast reception unit must be arranged at too great a distance from the control unit to permit use of an SCSI bus, as may occur if a satellite antenna is required for satellite reception, the broadcast data reception unit may be partitioned into a reception and demodulation unit at the antenna site and a buffer and controller near the control unit. The two pieces of the broadcast data and reception unit are linked by a serial link, such as an RS-422 line, allowing data to be fed to the buffer and controller for examination and transfer to the control unit. The RS-422 line is a differential input, twisted pair serial data cable. This transmission line is fast (one Mbit/sec.) and allows the use of a small diameter, inexpensive cable to connect the reception and demodulation unit with the buffer and controller of the broadcast data reception unit.

Since most of the information users are normally located in urban areas where FM sideband distribution may be used, it is sensible to make the FM sideband broadcast receiver attach mechanically to the control unit, probably using matching hardware so that the two units lock together with the data output of the receiver feeding directly into the data input of the control unit. Telephone communication with the central (accounting) office is provided by a modem in the user's workstation, where such is available, or a modem built into the standalone user interface unit.

Figure 9:
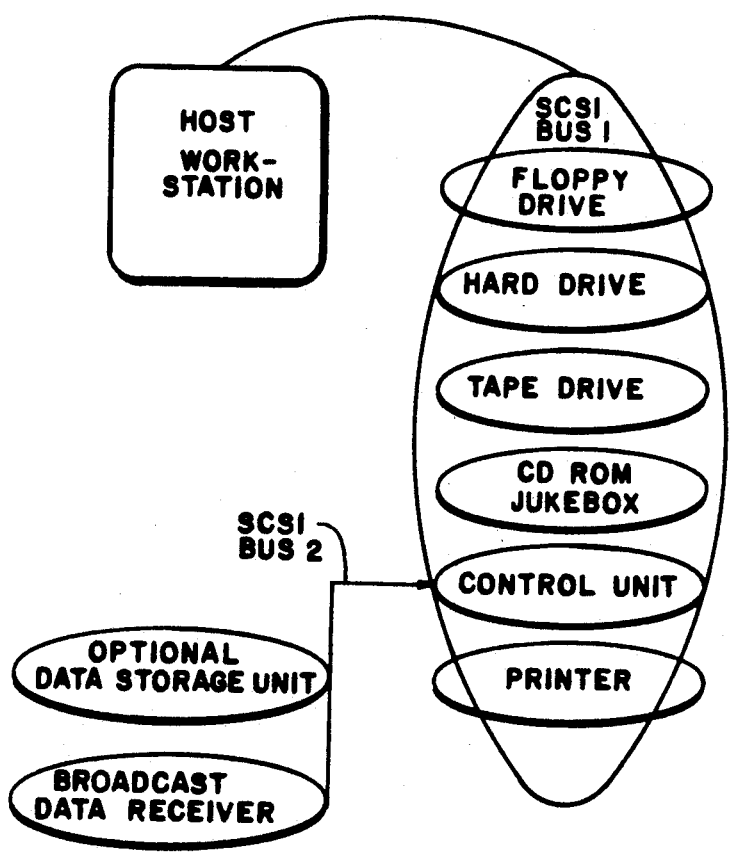
FIG. 9 is a representational diagram showing the general structure of the information distribution system illustrated in FIGS. 7 and 8.

The control unit can communicate with a standard user workstation via the SCSI bus. The SCSI bus protocol is well established so that SCSI has become the basic interconnect bus for technical workstations as well as some microcomputers such as the Apple MacIntosh and Next microcomputers. While it is not the basic interconnect bus for the IBM PC family at this time, it is extensively used in high performance PC units and SCSI bus interface cards for the IBM PC family are readily available. The resulting system structure is shown in FIG. 9.

SCSI interfaces frequently have speeds in excess of 10 MBits/sec. To not slow down the system excessively, information flowing into and out of the control unit is preferably extensively buffered. It is preferable if articles/references are treated as single entities, so that they are read into and out of the control unit in single operations. This requires that the buffer be large enough to contain the vast bulk of articles/references. As long as the articles/references that are being retrieved are not image based, a buffer size of about 512 KBytes is normally adequate.

Finally, the user interface unit, or "user unit", also communicates with the control unit via the main SCSI bus interface. As mentioned above, the user unit provides the modem communications to the central accounting office, as well as access to output devices such as a facsimile machine or printer. It also controls a display screen, touch screen/programmable keyboard (if present), keyboard access (if no touch screen is present), and serves to translate the user commands into commands for the control unit.

Figure 10:
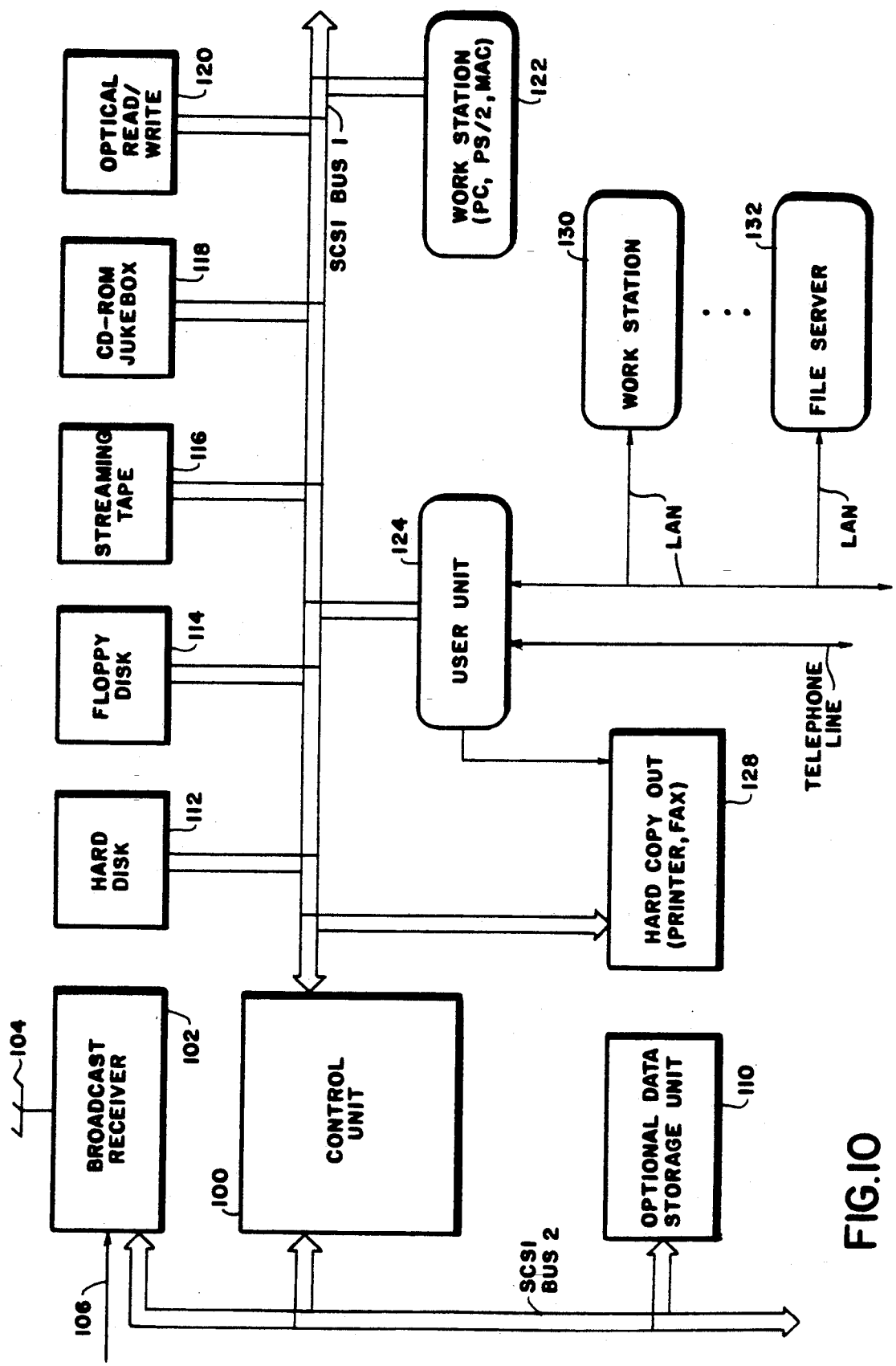
FIG. 10 is a block diagram showing the basic elements of the information distribution system illustrated in FIGS. 7-9.
Figure 11:
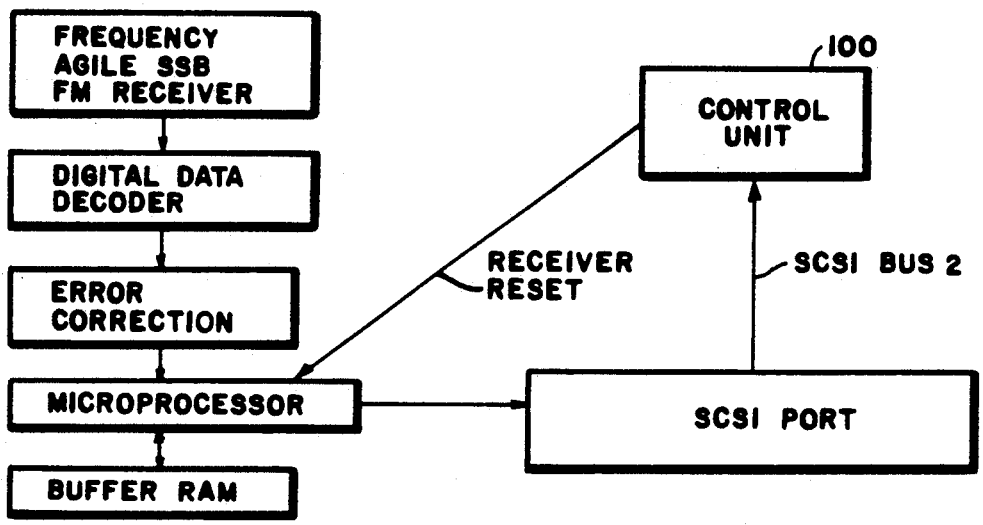
FIG. 11 is a block diagram showing the broadcast data reception unit of the information distribution system illustrated in FIG. 10.
Figure 12:
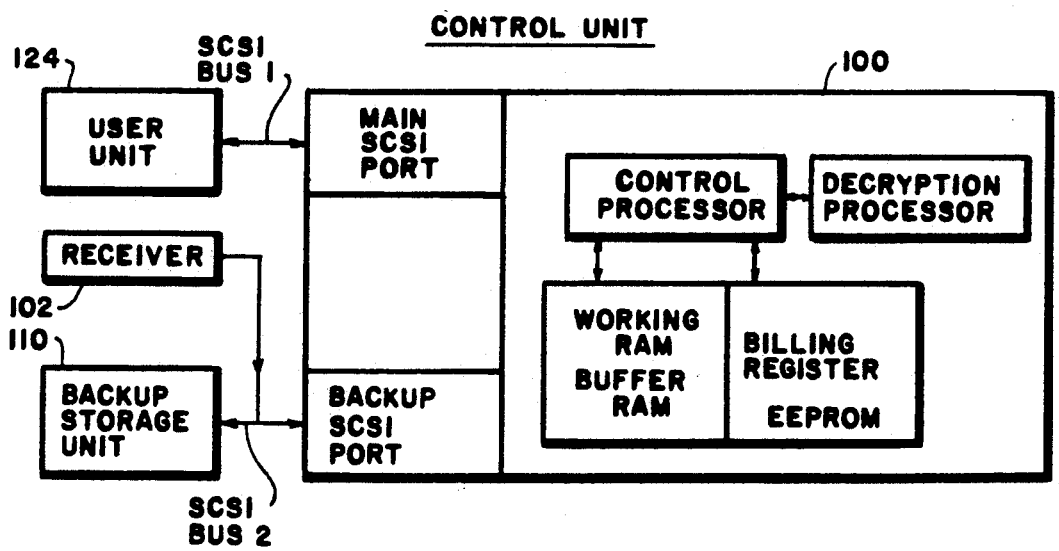
FIG. 12 is a block diagram showing the control unit of the information distribution system illustrated in FIG. 10.
Figure 13:
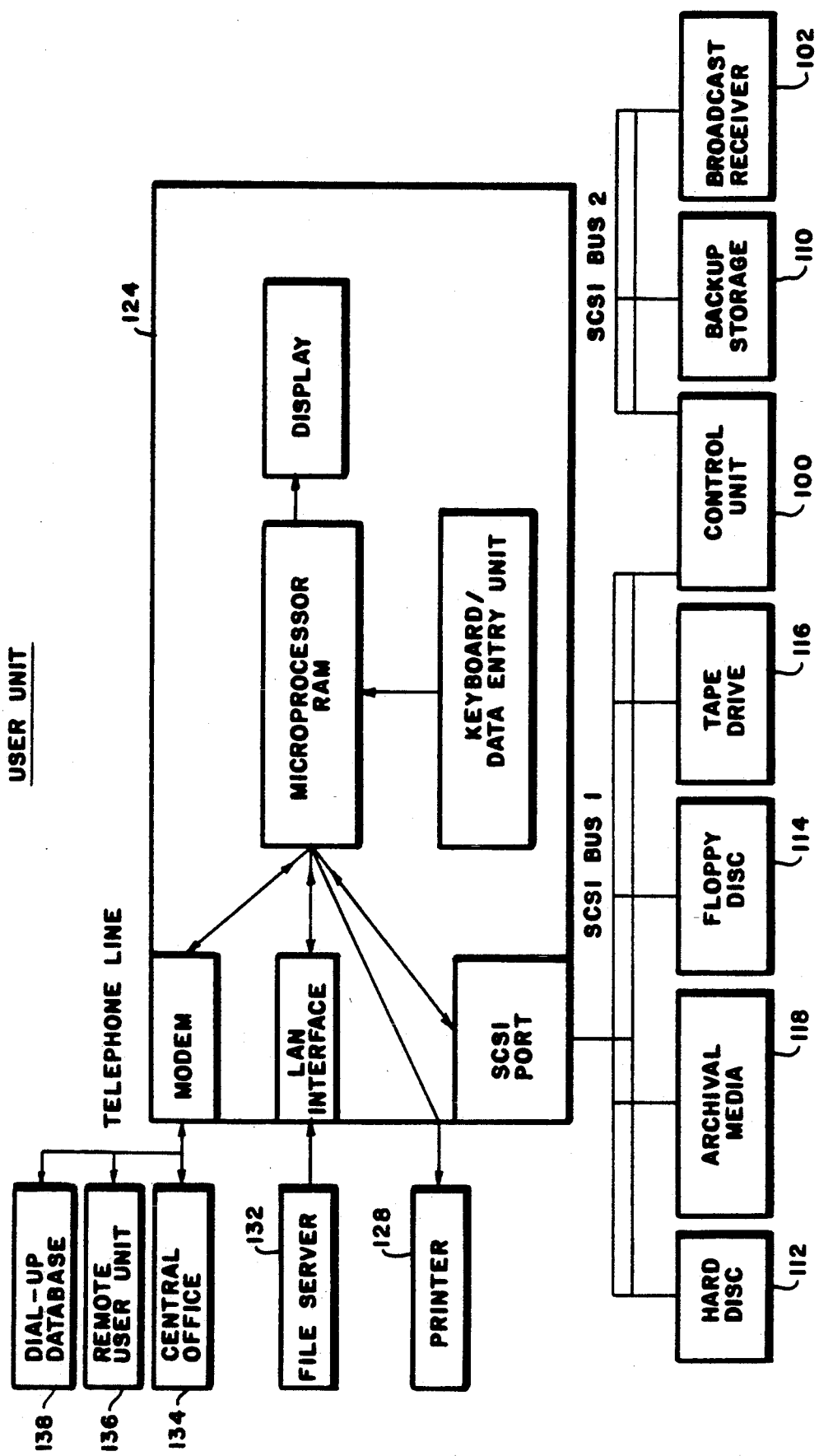
FIG. 13 is a block diagram showing the user unit of the information distribution system illustrated in FIG. 10.

The presently preferred embodiment of the information distribution system according to the present invention, which provides both archival information and current, update information at the disposal of the user, is illustrated in FIG. 10. Details of certain elements of this embodiment— namely, the broadcast data reception unit, the control unit and the user unit—are shown in FIGS. 11, 12 and 13, respectively.

As shown in FIG. 10, the system comprises the control unit 100 which serves as a central, coordinating computer for the entire system. The control unit receives current, update information from the data reception unit RF broadcast receiver 102, either via electromagnetic radiation received by an antenna 104 or via electrical signals transmitted by a cable 106.

The control unit communicates with all other elements of the system via two SCSI buses: a main SCSI Bus 1 and a backup SCSI Bus 2. The backup SCSI Bus 2 couples the control unit with the broadcast data reception unit 102 and the optional storage unit 110. This storage device 110 is preferably a high speed read/write memory such as a dynamic RAM.

Connected to the main SCSI Bus 1 are a variety of storage devices such as a hard disk drive 112, floppy disk drive 114, streaming tape drive 116, a CD-ROM jukebox 118 and an optical read/write storage device 120. It is contemplated that current information updates may be supplied by a floppy disk or streaming tape, hence the requirement for the storage devices 114 and 116. It is contemplated also that archival information will be supplied via CD-ROM, hence the requirement for the CD-ROM jukebox. Information updates will be read into the system and stored on a hard disk for rapid access, hence the requirement for the hard disk drive 112. Additional, high density storage is provided, if necessary, by the optical read/write storage device 120.

All of the storage devices 110-120 are conventional and currently commercially available.

Also connected to the main SCSI Bus 1 is either a conventional workstation 122, such as an IBM PC, PS/2, Apple MacIntosh or Next computer, or a standalone user interface unit ("user unit") 124 which will be described in detail hereinafter. The purpose and operation of the workstation 122 and user unit 124 are essentially the same: to provide a keyboard and display interface to a user; to provide a hard copy output (via printer, facsimile machine or the like) of the information selected by the user; to provide an interface with a local area network (LAN) which is connected to a file server 132 as well as to other workstations 130, monitoring devices and the like; and to provide a modem interface to a conventional telephone line.

Finally, hard copy output devices such as a mechanical or laser printer, facsimile machine or the like may also be connected to the main SCSI Bus 1. In this way, the SCSI interface of the user unit 124 or workstation 122 may be used to output data to this hard copy output device.

The broadcast data reception unit 102 is shown in detail in FIG. 11. This unit functions in a quite conventional manner to receive and decode a digital data stream from an FM or television carrier signal. This information is "piggy-backed" on a single sideband, in the case of FM, or in the vertical blanking interval (VBI) in the case of a video signal. Equipment of this type is conventional and currently commercially available.

If desired, error detection and correction can be performed on the decoded digital data stream under control of a microprocessor. The data stream is then supplied to the control unit 100 via the SCSI port and SCSI Bus 2. The receiver may be reset if it loses synchronism via the SCSI Bus 2 and SCSI port.

The control unit is, pure and simple, a microcomputer to which has been added a hard wired decryption processor (such as a DES integrated circuit) for decrypting the information packages selected by the user. FIG. 12 shows the preferred organization of this unit which includes a main SCSI port and a backup SCSI port. The control unit also includes (1) a buffer RAM for receiving entire information packages (IP's) from the broadcast receiver 102, the user unit 124 (or another workstation) and/or from the main or optional storage units and (2) a working RAM for processing (e.g., key word matching) these IP's.

Finally, the control unit includes a "billing register" which accumulates and stores the user fee and other account and statistical information for eventual transmission to a host computer at a central office. The billing register is preferably an EEPROM which cannot be erased or changed by the user. If the control unit is disconnected from the system and returned to the factory, the billing register will retain a record of the fees owed by the user.

The control unit operates to receive information packages (IP's) from a first, protected storage device, such as one of the devices 112, 114, 116 and 118, via the SCSI Bus 1 and to place selected IP's in a second storage device, such as its buffer RAM or working RAM and/or the backup storage unit 110 via the SCSI Bus 2. The processor of the control unit, under control of a stored program, performs the selection and retrieval function and stores the use fees to the billing register for the information packages transferred from the first storage device to the second storage device.

Preferably, the processor also stores in the billing register the identity of each IP that is transferred to the second storage device.

As mentioned above, a conventional workstation may be used to provide the user interface to the system. In the absence of such a workstation, a dedicated, standalone user interface unit 124 may be provided as is illustrated in FIG. 13. Like the control unit 100, this user unit is also a conventional microcomputer which includes an SCSI port for communication with the control unit and other devices on the SCSI Bus 1; a modem for telephone communication with the central office host computer and other remote systems; and a LAN interface for communication with other workstations and a file server 132.

The user unit also includes a data entry device, such as a keyboard, and a display device, such as a CRT or LCD panel.

Pursuant to requests by the control unit, the user unit is capable of communicating via its modem and the telephone line with (1) the host computer 134 at the central office; (2) another user unit 136 which is remote from the user unit 124; and (3) a dial-up database facility 138 such as Dialog or Lexis.

As indicated above, the user unit may also communicate with a printer 128 either directly or via the SCSI Bus 1.

Figure 14:
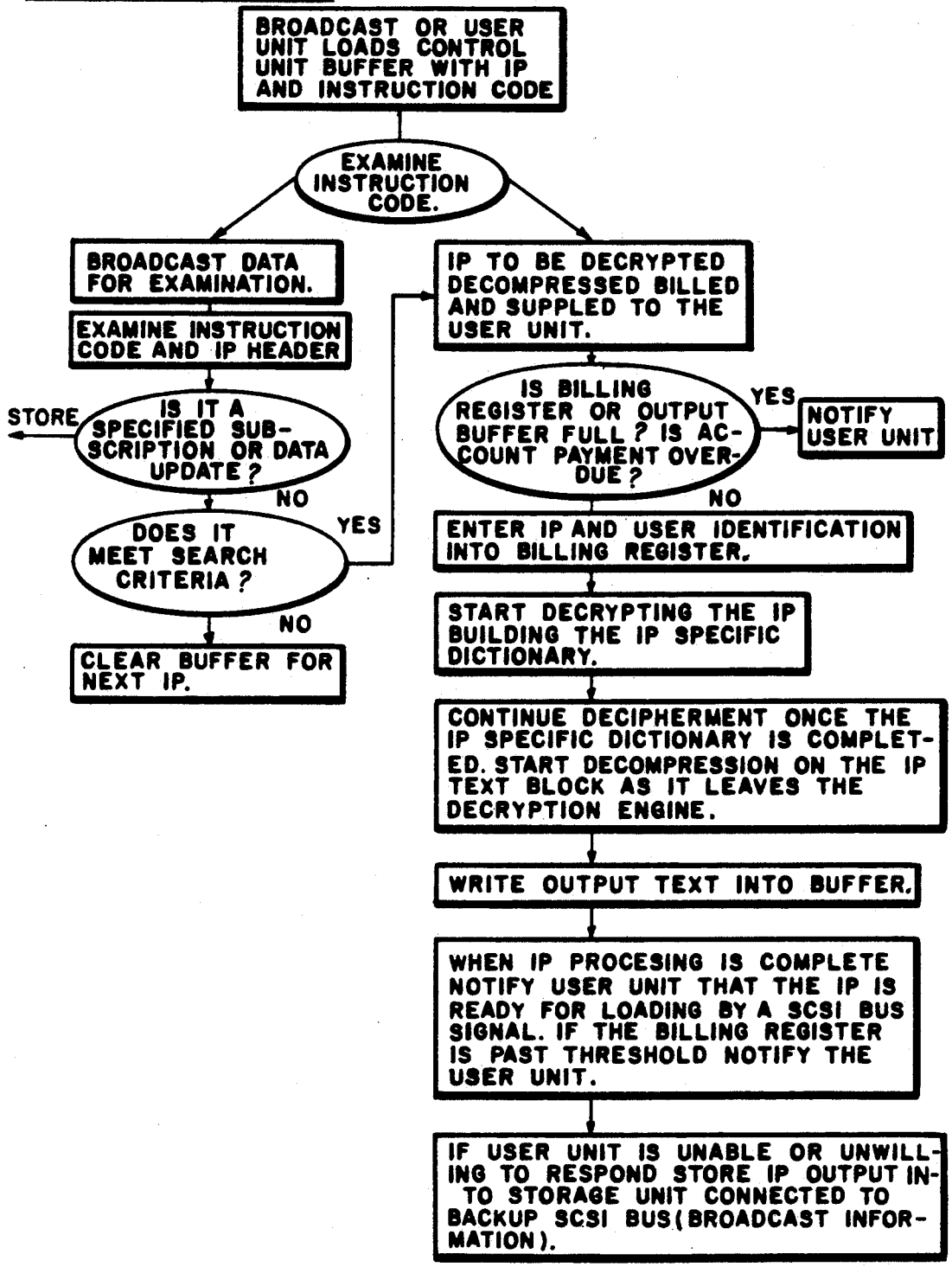
FIG. 14 is a flow chart illustrating the master program employed with the information distribution system illustrated in FIG. 10.

The operation of the information distribution system is governed by a master program contained in the control unit 100 and a subsidiary program contained in the user unit 124 (or workstation 122). This program will now be explained in connection with FIG. 14.

When the buffer RAM of the control unit is supplied and loaded with an IP, the sending unit (broadcast receiver or user unit) supplies an instruction code to inform the control unit what must be done with the IP.

The control unit first examines this instruction code to determine whether it came from the broadcast receiver or the user unit. If the instruction code came from the broadcast receiver, the control unit determines whether it should be stored as information received pursuant to a specified subscription or as a current update to the stored archival information. If the IP is to be stored, the control unit allocates a location in the hard disk memory and executes a store instruction.

If the broadcast information does not need to be stored, the control unit determines whether it meets the user's search criteria. If not, the information is completely ignored and the control unit buffer is cleared for the next IP.

If the user's search criteria are met, meaning that the user would like to view the IP on the display screen, or to print a hard copy, the control unit initiates a sequence of operations which are identical to those carried out when the IP has been selected and retrieved from local storage by means of the user unit.

Initially, the control unit determines whether the user's financial account is up-to-date. If not, the user unit, and thus the user, are notified and all further operations by the control unit are interrupted until the outstanding account is cleared up.

If the account is current, the IP identification and user identification are entered into the accounting (billing) register and decryption of the IP is commenced. During decryption, the IP specific dictionary is constructed from the cleartext information. Once the specific dictionary is completed, the control unit decompresses the IP test as it leaves the decryption processor.

The decrypted and decompressed text of the IP is written into the control unit buffer. When the IP processing is complete, the user unit is notified that the IP is ready for loading via the SCSI bus. Also, if the billing register is not full, the user unit is also notified.

The cleartext IP is then transmitted to the user unit if it is free to receive this information. If the user unit is unable to unwilling to respond, the IP is temporarily stored into the back-up storage unit 110.

Figure 15:
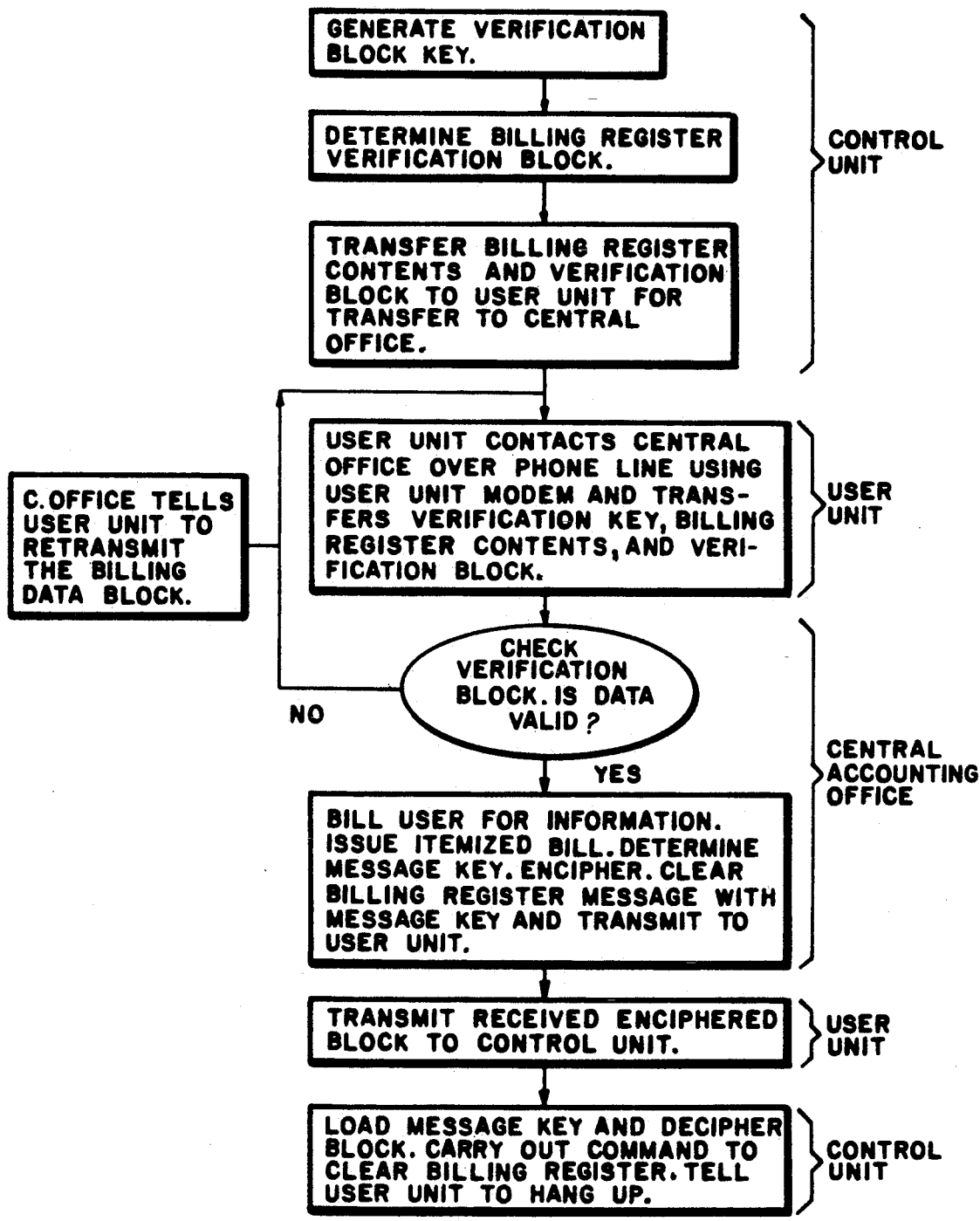
FIG. 15 is a flow chart showing the billing program employed with the information distribution system illustrated in FIG. 10.

The pay-per-package accounting system in the information distribution system according to the present invention is illustrated in FIG. 15. At periodic intervals, or when the billing register is nearly full, the control unit transfers the billing register contents to the user unit for transfer to the central accounting office. Prior to transfer, the control unit generates a verification block key and determines the billing register verification block to provide security for the billing register contents.

The user unit then dials up the central office via its modem and the telephone line and transfers the verification key, billing register contents and the verification block to the central office. The verification block is checked at the central office to ensure that the transmitted data is valid. If the data is not valid, the central office requests the retransmission of the billing data block.

Once valid information is transmitted, the central accounting office invoices the user for the information selected, retrieved and used. For example, the central office can print and mail an itemized invoice, or it can transmit the invoice directly to the user unit via the telephone connection for printing at the user unit.

Thereafter, the central office determines the next message key and then enciphers a "clear billing register" message with this message key. The enciphered message is then transmitted to the user unit which, in turn, passes it directly to the control unit. The control unit loads the message key, deciphers the message and carries out the command to clear the billing register. Finally, the control unit instructs the user unit to terminate the telephone connection.

In the case where the information packages (IP's) are transmitted by broadcast, the total length of an IP header block is preferably 64 bytes. The first 12 bytes are a synchronization string to allow a receiver to synchronize to the broadcast data stream. The next 2 bytes are the block count of the IP (its length in units of 32 byte blocks, not including the header block). The next 12 bytes are a message key. The following 22 bytes contain the article identification and classification information. The next 8 to 12 bytes are a checksum for the IP described by the header. The last 8 to 4 bytes are a checksum of the IP header itself. These checksums allow the validation of the IP and the IP header.

It should be emphasized that the IP header format may be varied, as desired, in accordance with the system requirements.

The preferred byte allocation is shown in the following Table:

TABLE I

| Broadcast IP Header | |
|---|---|
| XXXX | |
| XXXX | synchronization block |
| XXXX | |
| XX | IP block count |
| XXXX | message key |
| XXXX | |
| XX | |
| XXXX | |
| XXXX | IP identification and |
| XXXX | classification information |
| XXXX | |
| XXXX | |
| XXXX | |
| XXXX | IP validation block |
| XXXX | |
| XXXX | IP header validation block |

In the case of archival information packages (IP's), much less header information is needed. If the user software accesses the abstracts/headnotes, the information that is needed in the IP header is the message key, an IP identification number, and an IP validation block. This permits the use of a 32 byte header block.

The IP according to the present invention thus has a simple 3 part structure: The header block, the compressed dictionary, and the text block. If H represents the header block, D represent data blocks in the dictionary, and T represents data blocks in the text portion of the IP, the IP can be diagrammed in the following manner. The simplest structure for the IP is the header, followed by the dictionary, followed by the text block:

HDDDDDDDDDDDDDDDDDDDDDDDDDDD-
DDDDDTTTTTTTTTTTTTTTTTTTTTTTT-
TTT
TTTTTTTTTTTTTTTTTTTTTTTTTTTTT-
TTTTTTTTTTTTTTTTTTTTTTTTTTTT

If block transposition is used to disrupt the message structure and increase the cryptographic resistance of the system, this simple structure is made apparently random, although the header will still appear as the lead block:

HTTDTTTDTDTTTTTTTTDDTTTTTTTDTT-
TDTTTTTDTTTDDTTTTTTTDTTTTTD
DDTTTTDTTTTTTTDTDTTDTTTDDDTT-
TTDTTTTDTTTTDTTDTDTTTDTTTTDTDT
DTTTDTDTTDTTTDTTT

In this case it is necessary to use the keys to determine the transpose mapping so that the blocks can be fed through the decryption and decompression processors in the correct order.

The accounting (billing) register structure is also quite simple. This register contains a list of user access codes (if any), the associated IP identification numbers, as well as the IP prices, if desired (although the central billing office can look the prices up in its central databank.) The advantage of providing IP prices at the user site is for user convenience in selecting each IP and to maintain a local billing total that registers the current total billing amount. It is unlikely that publishers will want any more information be provided to users. 12 bytes are adequate for identifying a given IP and 4 bytes are adequate to identify an arbitrary user. Thus, the billing register preferably has the following structure:

TABLE II

```
UUUUIIIIIIIIIIII
UUUUIIIIIIIIIIII
UUUUIIIIIIIIIIII
................
................
UUUUIIIIIIIIIIII
```

In this Table U represents the user ID bytes and I represents the IP identification bytes for a given IP. The billing register is preferably implemented either as a battery-backed CMOS RAM chip or as an EEPROM, which is capable of lifetimes of 10,000 cycles (200 years at 1 cycle per week).

As needed and desired by users of the information distribution system, other optional features may be added to the system by providing appropriate stored programs in the control unit and user unit. For example, by providing a suitable encryption algorithm, a document generated by a user may be encrypted for its protection and security while stored in the system, e.g., on the hard disk 112, and subsequently decrypted and read out as cleartext by an authorized user (recipient). Instead of providing an encryption algorithm, it is also possible to use encipherment capable integrated circuits with the associated encipherment ROMs.

The status in the system as an encrypted user document is preferably defined in a document header block, which can also include identifying information on the sender as well as the intended recipient (authorized user) of the document. When the document is retrieved, the user unit, or control unit, is caused to look up the appropriate key, decrypt the document, and add a fee to the billing register. The agreed upon key is preferably supplied to the control unit when the document is entered allowing the control unit to generate a message key and encrypt the document with the enciphered message key. The user unit then constructs the header block from the message key, the document validation block, provided by the control unit, the document identification information, the sender and recipient information, and the header validation block, which the user unit calculates.

The information distribution system according to the present invention also lends itself to monitoring and controlling the use of information. This function is most easily accomplished by requiring each user to enter a personal identification code (PIC) into the system via the user unit keyboard. Stored within the system, for example in the working RAM of the control unit, are the PIC's of all users who are authorized to receive information. The processor of the control unit thus compares the PIC entered by each current user with the PIC's of the authorized users and enables operation of the system by the current user if these PIC's are equal.

In any case, by maintaining a record of the PIC of each current user, this PIC may be added to the billing register in association with the identity of each IP retrieved from the system by that user. The identity of each user of the system, as well as the IP's retrieved and the type and amount of usage by each user, will then be transmitted to the central office together with the user fee information.

Another optional feature easily designed into the information distribution system according to the present invention, is the ability to call up a remote host computer, or a dial-up database, for information which is not stored locally in the system. This is accomplished via telephone line by means of the modem in the user unit. Preferably, a transaction record is maintained of each call to a remote database and such transaction record is stored in the billing register for periodic transmission to the central office.

As a further optional feature of the information distribution system according to the invention, the user unit can transmit information packages (IP's) directly to a remote user unit, either in encrypted or in cleartext form. Again, this transmission can be effected via telephone line with aid of the modems at the respective user units, and a user fee may be added to the billing register.

As a still further optional feature of the information distribution system according to the present invention, the user unit may be integrated into a local area network (LAN) and may communicate directly with other workstations and/or a file server by its LAN interface. As indicated previously, a record of all transactions with other workstations and a file server may be maintained in the billing register for periodic transmission to the central office. The IP's received from a dial-up database, a remote user unit, other workstations and a file server may be integrated with the IP's stored in the local storage devices of the information distribution system or they may be segregated and stored in separate locations or devices at the local site. Preferably, user fees are charged for certain information packages (IP's) supplied to the local site, while other IP's, such as documents generated by the user, may be stored in the system and retrieved by the user without the assessment of a user fee.

There has thus been shown and described a novel information distribution system which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the claims which follow.

What is claimed is:

1. In a system for distributing information to a subscriber location, said system including a broadcasting station and a central billing station, said broadcasting station including transmitting a serial data stream including a plurality of information blocks, each information block including an encrypted information portion and a charge code portion, a method comprising:
   receiving said serial data stream;
   storing a search key word selected by said subscriber, said search key word representing a desired word pattern contained in information blocks of interest to said subscriber;
   searching said received serial data stream at said subscriber location using said stored search key word to select an information block by finding a match between said search key word and said information block;
   decrypting said encrypted information portion of said received information block;

storing said information portion of said received information block;

storing said charge code portion of said received information block;

retrieving said stored information portion of said received information block by said subscriber; and reporting said stored said charge code portion to said central billing station; whereby said subscriber is billed for said received information block.

2. A method in accordance with claim 1, further including accumulating said stored charge code portion to previously stored charge code portions of previously received information blocks responsive to said decrypting said encrypted information portion of said received information block; and reporting said accumulated stored charge code portions of said information blocks to said central billing station, whereby said subscriber is billed for said received information blocks.

3. A system method in accordance with claim 1, further including decrypting said encrypted information portion of said received information block responsive to said searching said received serial data stream at said subscriber location using said stored search key word to select an information block by finding a match between said search key word and said information block.

4. A method in accordance with claim 1, wherein said serial data stream further includes a reference data portion, said system method further including searching said reference data portion using said stored search key word to select an information block by finding a match between said search key word and said reference data portion.

5. A system method in accordance with claim 1, further including:

storing said received serial data stream in a first memory at said subscriber location; and transferring said received information block from said first memory to a second memory responsive to said step of searching said received serial data stream at said subscriber location using said stored search key word to select an information block by finding a match between said search key word and said information block.

6. An apparatus in accordance with claim 1, wherein said serial data stream further includes a reference data portion, said system method further including means for searching said reference data portion using said stored search key word to select an information block by finding a match between said search key word and said reference data portion.

7. In a system for distributing information to a subscriber location, said system including a broadcasting station and a central billing station, said broadcasting station including means for transmitting a serial data stream including a plurality of information blocks, each information block including an encrypted information portion and a charge code portion, an apparatus comprising:

means for receiving said serial data stream;

means for storing a search key word selected by said subscriber, said search key word representing a desired word pattern contained in information blocks of interest to said subscriber;

means for searching said received serial data stream at said subscriber location using said stored search key word to select an information block by finding a match between said search key word and said information block;

means for decrypting said encrypted information portion of said received information block;

means for storing said information portion of said received information block;

means for storing said charge code portion of said received information block;

means for retrieving said stored information portion of said received information block by said subscriber; and means for reporting said stored said charge code portion to said central billing station; whereby said subscriber is billed for said received information block.

8. An apparatus in accordance with claim 7, further including means for accumulating said stored charge code portion to previously stored charge code portions of previously received information blocks responsive to said means for decrypting said encrypted information portion of said received means for reporting said accumulated stored charge code portions of said information blocks to said central billing station, whereby said subscriber is billed for said received information blocks.

9. A system method in accordance with claim 7, further including means for decrypting said encrypted information portion of said received information block responsive to said means for searching said received serial data stream at said subscriber location using said stored search key word to select an information block by finding a match between said search key word and said information block.

10. A system method in accordance with claim 7, further including:

first and second memories;

means for storing said received serial data stream in said first memory at said subscriber location; and means for transferring said received information block from said first memory to said second memory responsive to said means for searching said received serial data stream at said subscriber location using said stored search key word to select an information block by finding a match between said search key word and said information block.

* * * * *